US006952440B1

United States Patent
Underbrink

(10) Patent No.: US 6,952,440 B1
(45) Date of Patent: Oct. 4, 2005

(54) SIGNAL DETECTOR EMPLOYING A DOPPLER PHASE CORRECTION SYSTEM

(75) Inventor: Paul A. Underbrink, Lake Forest, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 09/551,802

(22) Filed: Apr. 18, 2000

(51) Int. Cl.$^7$ .................................................. H04B 1/707
(52) U.S. Cl. ...................... 375/150; 375/142; 375/143; 375/152; 375/343; 375/346
(58) Field of Search .............................. 375/142, 143, 375/144, 147, 148, 150, 152, 340, 343, 346

(56) References Cited

U.S. PATENT DOCUMENTS

| | | | |
|---|---|---|---|
| 3,604,911 A | 9/1971 | Schmitt | 235/181 |
| 3,975,628 A | 8/1976 | Graves et al. | 250/199 |
| 4,426,712 A | 1/1984 | Gorski-Popiel | 375/96 |
| 4,445,118 A | 4/1984 | Taylor et al. | 343/357 |
| 4,463,357 A | 7/1984 | MacDoran | 343/460 |
| 4,578,678 A | 3/1986 | Hurd | 343/357 |
| 4,667,203 A | 5/1987 | Counselman, III | 342/357 |
| 4,701,934 A | 10/1987 | Jasper | 375/1 |
| 4,754,465 A | 6/1988 | Trimble | 375/1 |
| 4,785,463 A | 11/1988 | Janc et al. | 375/1 |
| 4,809,005 A | 2/1989 | Counselman, III | 342/352 |
| 4,821,294 A | 4/1989 | Thomas, Jr. | 375/96 |
| 4,890,233 A | 12/1989 | Ando et al. | 364/457 |

(Continued)

FOREIGN PATENT DOCUMENTS

| | | |
|---|---|---|
| EP | 0511741 A1 | 3/1992 |
| EP | 0511741 B1 | 3/1992 |
| EP | 0639901 A2 | 8/1994 |
| EP | 0639901 A3 | 8/1994 |
| JP | 08/065205 A | 3/1996 |
| JP | 08/065205 | 3/1996 |
| WO | WO 92/13392 | 1/1991 |
| WO | WO 00/19644 | 4/2000 |

OTHER PUBLICATIONS

D. J. R. Van Nee and A. J. R. M. Coenen, "New Fast GPS Code–Acquisition Technique Using FFT," Jan. 17, 1991, *Electronics Letters*, vol. 27, No. 2.

Primary Examiner—Khai Tran
Assistant Examiner—David B. Lugo
(74) Attorney, Agent, or Firm—Edward C. Kwok; MacPherson Kwok Chen & Heid LLP

(57) ABSTRACT

A spread spectrum detector employs a Doppler phase correction system that improves correlation of pseudo-noise (PN) codes to a received spread spectrum signal by combining phase shifts, in the time domain, to correlation values that compensate for the Doppler shift error that is inherent in the signal and that is imposed upon the signal by movement between the signal source and receiver. In architecture, the Doppler phase correction system includes a receiver to receive a spread spectrum modulated signal having the Doppler shift error, a multiplier to produce a plurality of complex first correlation values based upon the signal and a code. A phase shifter generates a plurality of complex second correlation values respectively from the first correlation values. The second correlation values being phase shifted by respective different amounts from corresponding first correlation values, so that the second correlation values exhibit less of the Doppler shift error than the first correlation values. The phase shifter can be implemented with a look-up table that stores a plurality of phase shift values, a counter that produces indices for the look-up table, and a multiplier that multiplies the phase shift values that are output from the look-up table with the first correlation values to produce the second correlation values. Finally, a combiner, such as an integrator, combines, or integrates, the second correlation values to derive a third correlation that indicates a degree of correspondence of the code with the signal.

62 Claims, 19 Drawing Sheets

U.S. PATENT DOCUMENTS

| | | | |
|---|---|---|---|
| 4,894,662 A | 1/1990 | Counselman | 342/357 |
| 4,894,842 A | 1/1990 | Broekhoven et al. | 375/1 |
| 4,992,720 A | 2/1991 | Hata | 320/23 |
| 4,998,111 A | 3/1991 | Ma et al. | 342/352 |
| 5,014,066 A | 5/1991 | Counselman, III | 342/352 |
| 5,018,088 A | 5/1991 | Higbie | 364/574 |
| 5,036,329 A | 7/1991 | Ando | 342/357 |
| 5,043,736 A | 8/1991 | Darnell et al. | 342/357 |
| 5,108,334 A | 4/1992 | Eschenbach et al. | 455/314 |
| 5,148,042 A | 9/1992 | Nakazoe | 307/65 |
| 5,153,591 A | 10/1992 | Clark | 341/51 |
| 5,179,724 A | 1/1993 | Lindoff | 455/76 |
| 5,202,829 A | 4/1993 | Geier | 364/449 |
| 5,225,842 A | 7/1993 | Brown et al. | 342/357 |
| 5,253,268 A | 10/1993 | Omura et al. | 375/1 |
| 5,276,765 A | 1/1994 | Freeman et al. | 395/2 |
| 5,293,170 A | 3/1994 | Lorenz et al. | 376/309 |
| 5,293,398 A | 3/1994 | Hamao et al. | 375/1 |
| 5,297,097 A | 3/1994 | Etoh et al. | 365/226 |
| 5,311,195 A | 5/1994 | Mathis et al. | 342/357 |
| 5,323,164 A | 6/1994 | Endo | 342/357 |
| 5,343,209 A | 8/1994 | Sennott et al. | 342/357 |
| 5,345,244 A | 9/1994 | Gildea et al. | 342/357 |
| 5,347,536 A | 9/1994 | Meehan | 375/1 |
| 5,352,970 A | 10/1994 | Armstrong, II | 320/39 |
| 5,363,030 A | 11/1994 | Ford et al. | 320/13 |
| 5,378,155 A | 1/1995 | Eldridge | 434/11 |
| 5,379,224 A | 1/1995 | Brown et al. | 364/449 |
| 5,396,515 A | 3/1995 | Dixon et al. | 375/208 |
| 5,402,346 A | 3/1995 | Lion et al. | 364/449 |
| 5,402,347 A | 3/1995 | McBurney et al. | 364/443 |
| 5,410,747 A | 4/1995 | Ohmagari et al. | 455/118 |
| 5,416,712 A | 5/1995 | Geier et al. | 364/450 |
| 5,418,818 A | 5/1995 | Marchetto et al. | 375/264 |
| 5,420,593 A | 5/1995 | Niles | 342/357 |
| 5,440,313 A | 8/1995 | Osterdock et al. | 342/352 |
| 5,450,344 A | 9/1995 | Woo et al. | 364/449 |
| 5,498,239 A | 3/1996 | Galel et al. | 604/95 |
| 5,504,684 A | 4/1996 | Lau et al. | 364/443 |
| 5,546,445 A | 8/1996 | Dennison et al. | 379/60 |
| 5,548,613 A | 8/1996 | Kahu et al. | 375/208 |
| 5,550,811 A | 8/1996 | Kahu et al. | 370/18 |
| 5,568,473 A | 10/1996 | Hemmati | 370/14 |
| 5,577,023 A | 11/1996 | Marum et al. | 370/16 |
| 5,577,025 A | 11/1996 | Skinner et al. | 370/22 |
| 5,592,173 A | 1/1997 | Lau et al. | 342/357 |
| 5,594,453 A | 1/1997 | Rodal et al. | 342/357 |
| 5,608,722 A | 3/1997 | Miller | 370/320 |
| 5,623,485 A | 4/1997 | Bi | 370/209 |
| 5,625,668 A | 4/1997 | Loomis et al. | 379/58 |
| 5,640,429 A | 6/1997 | Michaels et al. | 375/340 |
| 5,640,431 A | 6/1997 | Bruckert et al. | 375/344 |
| 5,642,377 A | 6/1997 | Chung et al. | 375/200 |
| 5,644,591 A | 7/1997 | Sutton | 375/200 |
| 5,649,000 A | 7/1997 | Lee et al. | 455/436 |
| 5,650,792 A | 7/1997 | Moore et al. | 343/725 |
| 5,654,718 A | 8/1997 | Beason et al. | 342/357 |
| 5,663,734 A | 9/1997 | Krasner | 342/357 |
| 5,663,735 A | 9/1997 | Eshenbach | 342/357 |
| 5,689,814 A | 11/1997 | Hagisawa et al. | 455/69 |
| 5,722,061 A | 2/1998 | Hutchison, IV et al. | 455/245.1 |
| 5,734,674 A | 3/1998 | Fenton et al. | 375/207 |
| 5,734,966 A | 3/1998 | Farrer et al. | 455/63 |
| 5,737,329 A | 4/1998 | Horiguchi | 370/441 |
| 5,739,596 A | 4/1998 | Takizawa et al. | 307/66 |
| 5,749,067 A | 5/1998 | Barrett | 704/233 |
| 5,781,156 A | 7/1998 | Krasner | 342/357 |
| 5,784,695 A | 7/1998 | Upton et al. | 455/442 |
| 5,786,789 A | 7/1998 | Janky | 342/357 |
| 5,812,087 A | 9/1998 | Krasner | 342/357 |
| 5,825,327 A | 10/1998 | Krasner | 342/357 |
| 5,828,694 A | 10/1998 | Schipper | 375/208 |
| 5,831,574 A | 11/1998 | Krasner | 342/357 |
| 5,832,021 A | 11/1998 | Kondo | 375/200 |
| 5,841,396 A | 11/1998 | Krasner | 342/357 |
| 5,845,203 A | 12/1998 | LaDue | 455/414 |
| 5,854,605 A | 12/1998 | Gildea | 342/357 |
| 5,859,874 A * | 1/1999 | Wiedeman et al. | 375/267 |
| 5,862,465 A | 1/1999 | Ou | 455/234.1 |
| 5,867,535 A | 2/1999 | Phillips et al. | 375/295 |
| 5,867,795 A | 2/1999 | Novis et al. | 455/566 |
| 5,872,540 A | 2/1999 | Casabona et al. | 342/362 |
| 5,874,914 A | 2/1999 | Krasner | 342/357 |
| 5,877,724 A | 3/1999 | Davis | 342/357 |
| 5,877,725 A | 3/1999 | Kalafus | 342/357 |
| 5,881,371 A | 3/1999 | Reynolds | 455/83 |
| 5,883,594 A | 3/1999 | Lau | 342/357 |
| 5,884,214 A | 3/1999 | Krasner | 701/207 |
| 5,889,474 A | 3/1999 | LaDue | 340/825.49 |
| 5,903,654 A | 5/1999 | Milton et al. | 380/49 |
| 5,907,809 A | 5/1999 | Molnar et al. | 455/456 |
| 5,909,640 A | 6/1999 | Farrer et al. | 455/63 |
| 5,917,444 A | 6/1999 | Loomis et al. | 342/357 |
| 5,917,829 A | 6/1999 | Hertz et al. | 370/479 |
| 5,920,283 A | 7/1999 | Shaheen et al. | 342/357 |
| 5,923,703 A | 7/1999 | Pon et al. | 375/209 |
| 5,924,024 A | 7/1999 | Ikeda et al. | 455/313 |
| 5,926,131 A | 7/1999 | Sakumoto et al. | 342/357 |
| 5,936,572 A | 8/1999 | Loomis et al. | 342/357 |
| 5,943,363 A | 8/1999 | Hanson et al. | 375/206 |
| 5,945,944 A | 8/1999 | Krasner | 342/357.06 |
| 5,956,328 A | 9/1999 | Sato | 370/335 |
| 5,963,582 A | 10/1999 | Stansell, Jr. | 375/200 |
| 5,970,084 A | 10/1999 | Honda | 375/200 |
| 5,977,909 A | 11/1999 | Harrison et al. | 342/357.09 |
| 5,982,324 A | 11/1999 | Watters et al. | 342/357.06 |
| 5,987,016 A | 11/1999 | He | 370/335 |
| 5,991,309 A | 11/1999 | Jensen et al. | 370/492 |
| 5,991,613 A | 11/1999 | Euscher et al. | 455/277.1 |
| 5,995,537 A | 11/1999 | Kondo | 375/208 |
| 5,999,124 A | 12/1999 | Sheynblat | 342/357.09 |
| 6,002,362 A | 12/1999 | Gudat | 342/357.03 |
| 6,002,363 A | 12/1999 | Krasner | 342/357.1 |
| 6,002,709 A | 12/1999 | Hendrickson | 375/206 |
| 6,009,551 A | 12/1999 | Sheynblat | 714/776 |
| 6,016,119 A | 1/2000 | Krasner | 342/357.06 |
| 6,023,462 A | 2/2000 | Nieczyporowicz et al. | 370/335 |
| 6,041,222 A | 3/2000 | Horton et al. | 455/255 |
| 6,047,016 A | 4/2000 | Ramberg et al. | 375/200 |
| 6,047,017 A | 4/2000 | Cahn et al. | 375/200 |
| 6,049,715 A | 4/2000 | Willhoff et al. | 455/436 |
| 6,052,081 A | 4/2000 | Krasner | 342/357.02 |
| 6,061,018 A | 5/2000 | Sheynblat | 342/357.06 |
| 6,064,336 A | 5/2000 | Krasner | 342/357.05 |
| 6,064,688 A | 5/2000 | Yanagi | 375/149 |
| 6,075,809 A | 6/2000 | Naruse | 375/147 |
| 6,104,338 A | 8/2000 | Krasner | 342/357.06 |
| 6,104,340 A | 8/2000 | Krasner | 342/357.1 |
| 6,107,960 A | 8/2000 | Krasner | 342/357.09 |
| 6,111,540 A | 8/2000 | Krasner | 342/357.1 |
| 6,131,067 A | 10/2000 | Girerd et al. | 701/213 |
| 6,133,871 A | 10/2000 | Krasner | 342/357.06 |
| 6,133,873 A | 10/2000 | Krasner | 342/357.12 |
| 6,133,874 A | 10/2000 | Krasner | 342/357.15 |
| 6,150,980 A | 11/2000 | Krasner | 342/357.1 |
| 6,167,347 A * | 12/2000 | Lin | 701/214 |
| 6,298,083 B1 * | 10/2001 | Westcott et al. | 375/150 |
| 6,373,882 B1 * | 4/2002 | Atarius et al. | 375/148 |
| 6,563,861 B1 * | 5/2003 | Krasny et al. | 375/150 |
| 6,577,271 B1 * | 6/2003 | Gronemeyer | 342/378 |
| 2002/0012387 A1 * | 1/2002 | Shakeri et al. | 375/150 |

SIGNAL DETECTOR
20c'

SIGNAL DETECTOR EMPLOYING A DOPPLER PHASE CORRECTION SYSTEM

TECHNICAL FIELD

The present invention generally relates to the field of wireless spread spectrum communications and signal detection using correlation analysis, and more particularly, to a signal detector employing a Doppler phase correction system for correcting Doppler shift associated with a received signal during correlation analysis.

BACKGROUND OF THE INVENTION

The Global Positioning System (GPS) is a collection of 24 earth-orbiting satellites. Each of the GPS satellites travels in a precise orbit about 11,000 miles above the earth's surface. A GPS receiver locks onto at least 3 of the satellites, and responsive, thereto, is able to determine its precise location. Each satellite transmits a signal modulated with a unique pseudo-noise (PN) code. Each PN code comprises a sequence of 1023 chips which are repeated every millisecond consistent with a chip rate of 1.023 MHz. Each satellite transmits at the same frequency. For civil applications, the frequency is known as L1 and is 1575.42 MHz. The GPS receiver receives a signal which is a mixture of the transmissions of the satellites that are visible to the receiver. The receiver detects the transmission of a particular satellite by correlating the received signal with shifted versions of the PN code for that satellite. If the level of correlation is sufficiently high so that there is a peak in the level of correlation achieved for a particular shift and PN code, the receiver detects the transmission of the satellite corresponding to the particular PN code. The receiver then uses the shifted PN code to achieve synchronization with subsequent transmissions from the satellite.

The receiver determines its distance from the satellite by determining the code phase of the transmission from the satellite. The code phase (CP) is the delay, in terms of chips or fractions of chips, that a satellite transmission experiences as it travels the approximately 11,000 mile distance from the satellite to the receiver. The receiver determines the code phase for a particular satellite by correlating shifted versions of the satellite's PN code with the received signal after correction for Doppler shift. The code phase for the satellite is determined to be the shift which maximizes the degree of correlation with the received signal.

The receiver converts the code phase for a satellite to a time delay. It determines the distance to the satellite by multiplying the time delay by the velocity of the transmission from the satellite. The receiver also knows the precise orbits of each of the satellites. Updates to the locations of the satellites are transmitted to the receiver by each of the satellites. This is accomplished by modulating a low frequency (50 Hz) data signal onto the PN code transmission from the satellite. The data signal encodes the positional information for the satellite. The receiver uses this information to define a sphere around the satellite at which the receiver must be located, with the radius of the sphere equal to the distance the receiver has determined from the code phase. The receiver performs this process for at least three satellites. The receiver derives its precise location from the points of intersection between the at least three spheres it has defined.

The Doppler shift (DS) is a frequency shift in the satellite transmission caused by relative movement between the satellite and the receiver along the line-of-sight (LOS). It can be shown that the frequency shift is equal to $v_{LOS}/v$, where $v_{LOS}$ is the velocity of the relative movement between the satellite and receiver along the LOS, and $\lambda$ is the wavelength of the transmission. The Doppler shift is positive if the receiver and satellite are moving towards one another along the LOS, and is negative if the receiver and satellite are moving away from one another along the LOS.

The Doppler shift alters the perceived code phase of a satellite transmission from its actual value. Hence, the GPS receiver must correct the satellite transmissions for Doppler shift before it attempts to determine the code phase for the satellite through correlation analysis.

The situation is illustrated in FIG. 1, which shows a GPS receiver 10 and three GPS satellites 12a, 12b, and 12c. Each satellite 12a, 12b, and 12c is transmitting to the OPS receiver 10. Satellite 12a is moving towards the GPS receiver 10 along the LOS at a velocity $v_a^+$ 14; satellite 12b is moving away from the GPS receiver 10 along the LOS at a velocity $v_b^-$ 16; and satellite 12c is moving away from the GPS receiver 10 along the LOS at a velocity $v_c^-$ 18. Consequently, assuming a carrier wavelength of $\lambda$, the transmission from satellite 12a will experience a positive Doppler shift of $$\frac{v_a^+}{\lambda};$$

the transmission from satellite 12b will experience a negative Doppler shift of $$\frac{v_b^-}{\lambda};$$

the transmission form satellite 12c will experience a negative Doppler shift of $$\frac{v_c^-}{\lambda}.$$

One system for correcting for the Doppler shift is described in commonly assigned U.S. patent application, Ser. No. 09/145,055, filed Sep. 1, 1998, and entitled "DOPPLER CORRECTED SPREAD SPECTRUM MATCHED FILTER," now U.S. Pat. No. 6,044,105, the disclosure of which is hereby incorporated by reference in its entirety. In the foregoing system, a Doppler generator produces a complex phase shift value (having real and imaginary components) that it combined with an incoming complex data sample prior to correlation with a PN code in a matched filter correlator, so that Doppler error is minimized. Although meritorious to an extent, this system still suffers from some Doppler error. Thus, there is still a need for ways to further improve correlation analysis by better compensating for Doppler shift.

SUMMARY OF THE INVENTION

This invention provides a spread spectrum detector that employs a Doppler phase correction system that effectively improves correlation of pseudo-noise (PN) codes to a received spread spectrum signal. The correlation is improved by combining phase shifts, in the time domain, to correlation values that compensate for the Doppler shift error that is inherent in the signal and that is imposed upon the signal by movement between the signal source and receiver. The Doppler phase correction system enables quicker identification of PN codes, even with an extremely low S/N ratio. Although not limited to this particular application, the spread spectrum detector is particularly suited for implementation in a global positioning system (GPS) receiver that receives GPS satellite signals that are subject to the undesirable Doppler shift.

In architecture, the Doppler phase correction system includes a receiver, such as an RF receiver, that is designed to receive a spread spectrum modulated signal, for instance, a GPS signal, having the Doppler shift error. The architecture also includes a multiplier, for example, a hardware-based matched filter or suitably programmed DSP, that is in communication with the receiver and is configured to produce a plurality of complex first correlation values (including phase and magnitude information) based upon the received signal and a PN code. For example, the complex first correlation values may be produced by multiplying a succession of signal samples with a series of PN codes and different phases of such codes. The ultimate object is to determine which of the PN code phases matches the received signal, so that the received signal can be decoded with the appropriate PN code and phase.

A phase shifter in communication with the multiplier is designed to generate a plurality of complex second correlation values respectively from the first correlation values. In order to produce the second correlation values, the first correlation values are phase shifted by respective different amounts. As an example of an architecture for the phase shifter, the phase shifter can be implemented with a look-up table that stores a plurality of phase shift values, a counter that produces indices for the look-up table, and a multiplier that multiplies the phase shift values that are output from the look-up table with the first correlation values to produce the second correlation values. The second correlation values exhibit less Doppler shift than the first correlation values due to the imposed phase shifts.

Finally, a combiner, such as an integrator, in communication with the phase shifter, is designed to combine or integrate the second correlation values over time to derive a third correlation value from the plurality of the second correlation values. The third correlation value can be used to efficiently determine which PN code and phase matches the received signal.

The combining or integration can be performed using coherent or noncoherent integration. With coherent integration, magnitude and phase information associated with separate second correlation values is combined separately by separately adding the real and imaginary values of two correlation values to produce a resultant coherent correlation value. With noncoherent integration, the phase information is first eliminated from the second correlation values that are to be combined by converting the real and imaginary parts of the correlation values to merely magnitude values, and then, the separate magnitude values of the separate correlation values are combined, such as by addition, to derive a resultant noncoherent correlation value.

This invention can also be broadly conceptualized as providing a method for improving efficiency and speed of correlation of pseudo-noise (PN) codes to a received spread spectrum signal by combining phase shifts to correlation values that compensate for the Doppler shift error imposed upon the signal. In this regard, the method can be broadly summarized by the following steps: receiving a spread spectrum modulated signal having a Doppler shift error imposed by movement between a signal source and receiver; producing a plurality of complex first correlation values based upon the signal and a code; generating a plurality of complex second correlation values respectively from the first correlation values, the second correlation values being phase shifted by respective different amounts from corresponding first correlation values; and integrating the second correlation values to derive a complex third correlation value that exhibits less Doppler shift than the first and second correlation values.

Related methods of operation and computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The Doppler phase correction system and method of the present invention can be implemented in a spread spectrum signal detector to improve correlation of pseudo-noise (PN) codes to a received spread spectrum signal by combining phase shifts to correlation values that compensate for the Doppler shift error that is inherent in the signal and that is imposed upon the signal by movement between the signal source and receiver.

A. Signal Detectors Employing the Doppler Phase Correction System

Several examples of possible embodiments of a signal detector that employs the Doppler phase correction system are now described.

Figure 2:
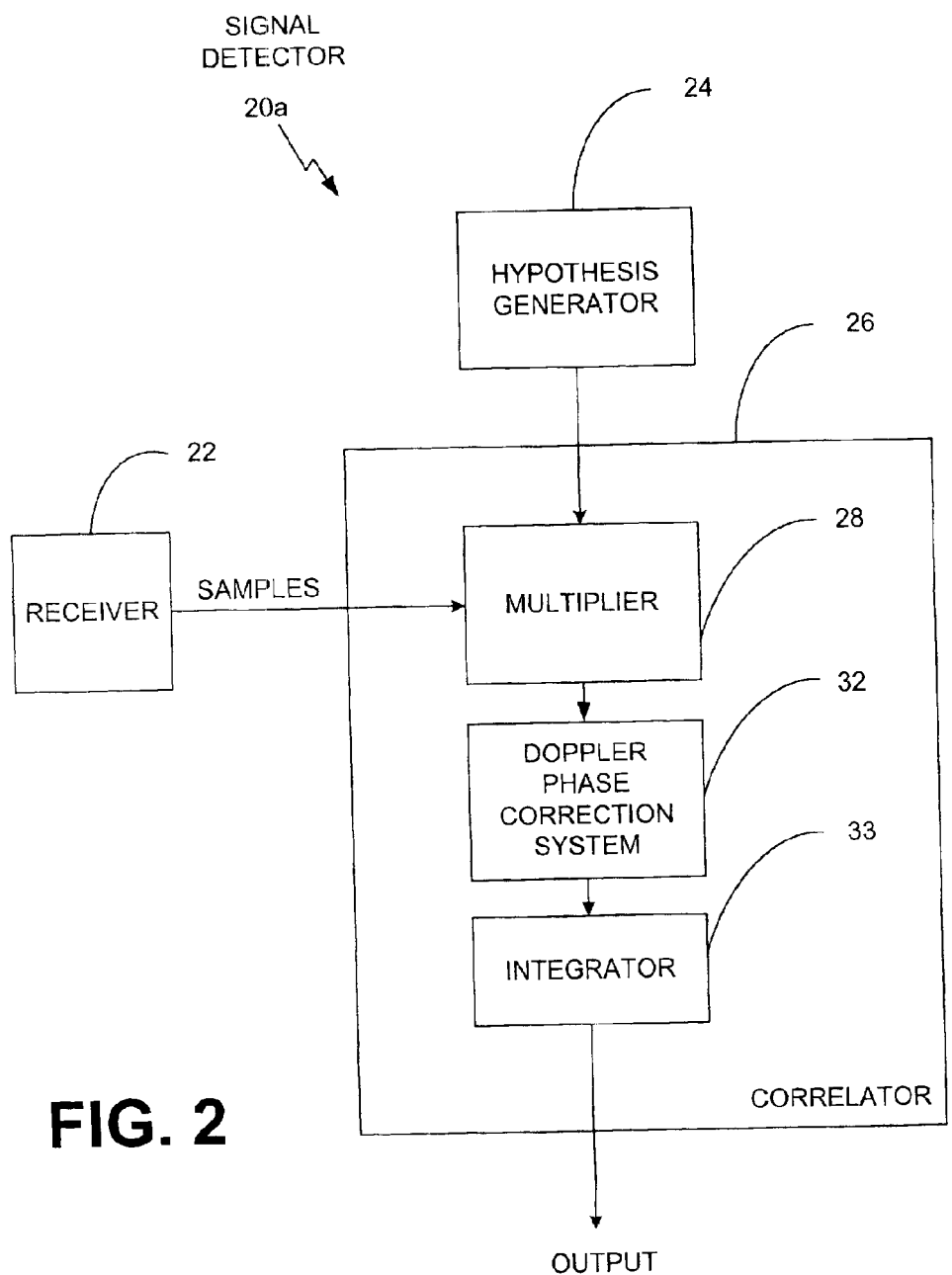
FIG. 2 illustrates an embodiment of a signal detector employing the Doppler phase correction system of the present invention.

A block diagram of an embodiment of a signal detector employing the Doppler phase correction system of the present invention is illustrated in FIG. 2 and is generally denoted by reference numeral 20a. As illustrated, the signal detector 20a comprises a receiver 22, for example but not limited to, a conventional radio frequency (RF) receiver, configured to receive a signal and provide samples thereof. The signal may comprise a signal of interest perturbed by noise. Alternatively, in accordance with a spread spectrum environment, the signal may comprise the combination of multiple signals of interest, each encoded using one of a plurality of pseudo-noise (PN) codes (e.g., gold codes). In this case, other signals appear as noise to a particular coded signal of interest. The samples of the signal each have an in-phase component (I; real number component) and a quadrature phase component (Q; imaginary number component) which are collectively indicative of phase and magnitude and can be represented mathematically as a complex number of the following form: $I+jQ$.

A hypothesis generator 24 generates a plurality of hypotheses (for example, a code, code phase, a Doppler phase shift between the signal source and receiver, and perhaps other parameters) about the signal of interest. A correlator 26 is provided which comprises a multiplier 28 and a integrator 33. The multiplier 28 receives the plurality of hypotheses from hypothesis generator 24, and samples of the signal received by receiver 22, and responsive thereto, generates product data representative of the product (or sum of products) of the samples of the received signal and data representative of each of the plurality of generated hypotheses.

The product data is communicated to the Doppler phase correction system 32 of the present invention, which in essence, introduces a phase shift into the data, and in some implementations expands the data, so that the Doppler shift inherent in the signal carrier (resulting from movement between the signal source and the signal receiver along the line of sight) is minimized and preferably substantially eliminated. Examples of embodiments of the Doppler phase correction system 32 will be described later in this document in connection with FIGS. 14–16.

Still referring to FIG. 2, next, the phase shifted product data is provided to integrator 33, which coherently and/or noncoherently integrates the product data for a given hypothesis over a defined duration. The concepts of coherent and noncoherent integration are well known in the art. When coherent integration is performed, the phase information is taken into account for the samples of receiver 22 which are reflected in the product data for a given hypothesis. Each of the product values have real and imaginary components, or equivalently, magnitude and phase components, and coherent integration is achieved by separately integrating the real and imaginary, or equivalently the magnitude and phase components, of the product values. The result is a correlation value, having real and imaginary components, or equivalently, magnitude and phase components, for the given hypothesis which measures the degree of correlation between the given hypothesis and the received signal. When noncoherent integration is performed, then the real and imaginary components are converted to a magnitude without a phase, and then the magnitudes are integrated over time.

The foregoing procedure is repeated for each of the hypotheses of interest generated by hypothesis generator 24. The result is that a plurality of correlation values are output by the integrator 33, each corresponding to a given hypothesis, and each having either (a) magnitude and phase components or (b) merely or merely a magnitude.

These correlation values are then analyzed, and, responsive thereto, one of the tested hypotheses is selected as the correct one. In one implementation, this is accomplished through peak detection, according to which a correlation value is selected which has a significantly larger magnitude than that of the other correlation values. The hypothesis corresponding to this correlation value is then selected as the correct hypothesis. Because of the Doppler phase correction system 32 of the present invention, the correct hypothesis is identified more quickly, because the correlations as well as the integrations are enhanced.

The hypothesis generator 24, multiplier 28, Doppler phase correction system 32, and the integrator 33 (in the embodiments shown in FIGS. 4 and 5) can be implemented in hardware, software, firmware, or a combination thereof. As an example, each or all can be implemented with software that is executed by a suitable processor, such as a conventional digital signal processor (DSP) and/or general purpose microprocessor. As an example of an alternative, the multiplier 28 may be implemented as a well known matched filter in hardware-based combinational logic. When any of the foregoing elements 24, 26, 28, 32 or 33 are implemented in hardware, they can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

When any of the foregoing elements 24, 26, 28, 32 or 33 are implemented in software or firmware, which comprises an ordered listing of executable instructions for implementing logical functions, they can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
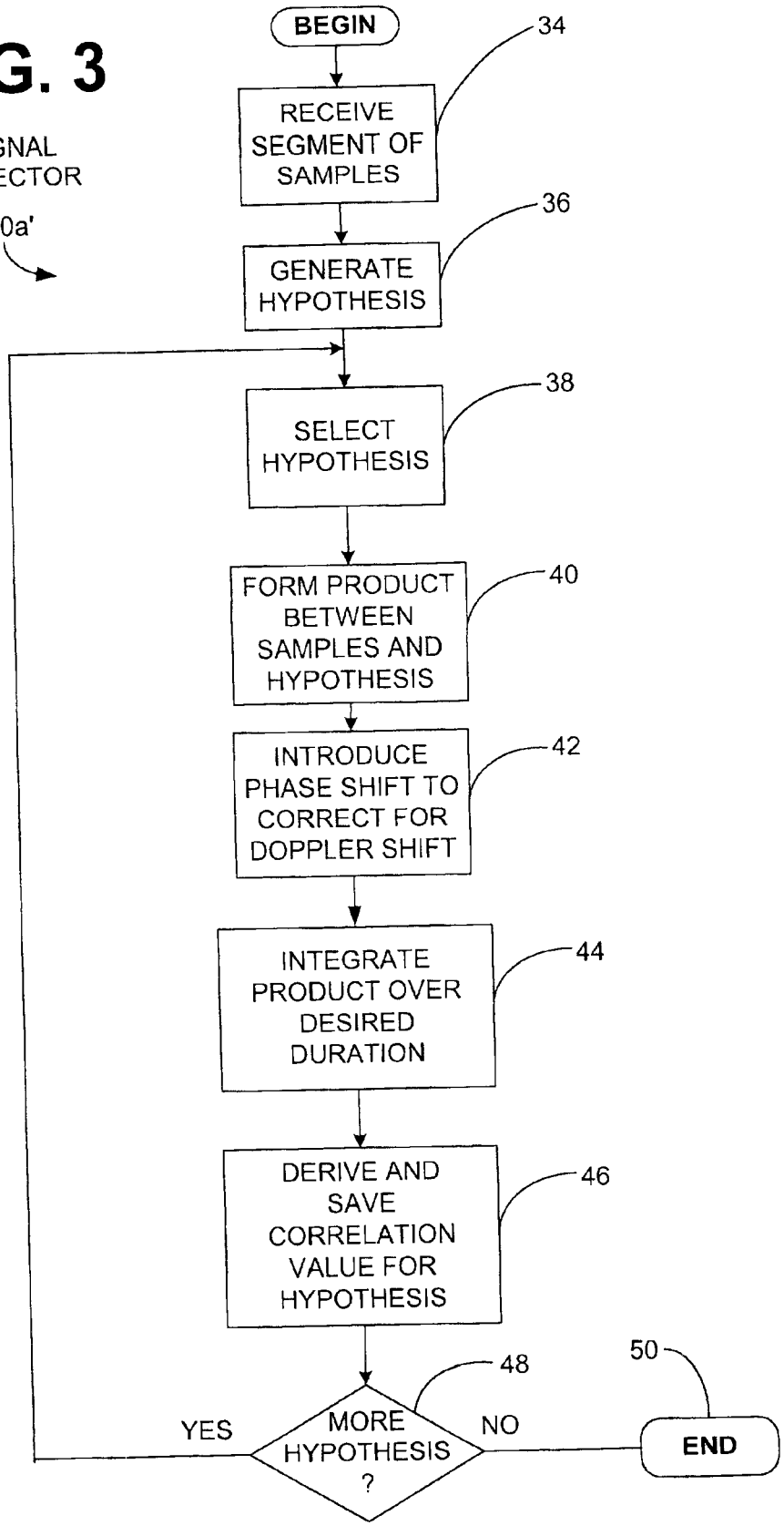
FIG. 3 illustrates a method of operation of the signal detector of FIG. 2

A flowchart $20a'$ of an example of a method of operation of a signal detector $20a$ (FIG. 2) in accordance with the foregoing embodiment is illustrated in FIG. 3. As illustrated, the process begins at step 34, in which a segment of samples of a signal is received. Typically, the signal comprises a signal of interest perturbed by noise or pseudo-noise.

Then, in step 36, a plurality of hypotheses are generated for testing. In step 38, one of the hypotheses from step 36 is selected, and in step 40, the product is formed between the samples of the signal and data representative of the hypothesis selected in step 38.

In step 42, the product data is phase shifted pursuant to the Doppler phase correction system 32 (FIG. 3).

At step 44, the phase shifted product data resulting from step 42 is integrated, coherently or incoherently, over a defined duration, and in step 46, a correlation value is derived from the integration performed in step 44, and saved for the hypothesis.

In step 48, a determination is made whether there are any additional hypotheses of the plurality generated in step 36 that remain to be tested. If so, a jump is made to step 38, and the process beginning at this point repeats itself for one of the remaining hypotheses. If not, the process ends 50.

Figure 4:
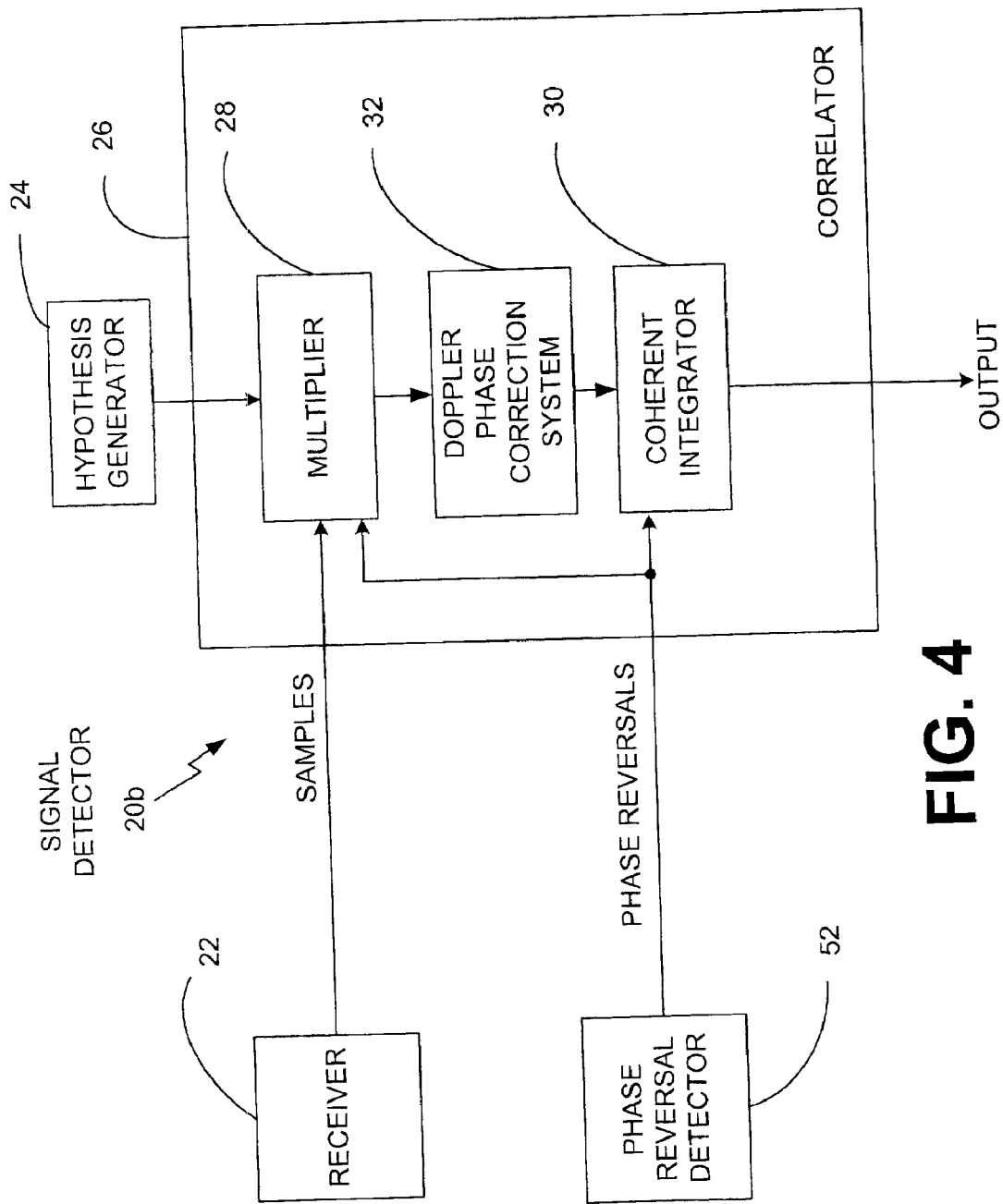
FIG. 4 illustrates a further embodiment of a signal detector employing the Doppler phase correction system of the present invention.

An alternate embodiment of a signal detector 20b employing the Doppler phase correction system 32 (FIG. 2) of the present invention is illustrated in FIG. 4, in which, compared to FIG. 2, like elements are referenced with like identifying numerals.

In this embodiment, the receiver 22 receives a signal, which typically is a signal of interest perturbed by noise. The signal of interest is subject to phase reversals which occur at defined frame boundaries. In one nonlimiting example of an implementation, these phase reversals occur due to a low frequency data signal which is modulated onto a higher frequency signal (spread spectrum modulated signal) comprising a repeating PN code modulated onto a carrier signal. The receiver 22 samples the signal and provides the samples to multiplier 28 which, together with the Doppler phase correction system 32 and the coherent integrator 30, forms the correlator 26.

As before, hypothesis generator 24 generates a plurality of hypotheses to be tested, and provides the same to multiplier 28. Multiplier 28, responsive to the hypotheses generated by hypothesis generator 24 and the samples from receiver 22, forms the product or sum of products between the samples and each of the hypotheses and provides the resulting product data to the Doppler phase correction system 32. The Doppler phase correction system 32 introduces a phase shift into the product data for correcting the inherent Doppler shift in the product data and then transfers the phase shifted data to the coherent integrator 30.

Phase reversal detector 52 is also provided. In one implementation, it is physically external to the signal detector 20b, perhaps on another circuit board, microchip, and/or at a remote location. In another implementation, it is internal to the signal detector 20b, perhaps on the same microchip. In the implementation in which the phase reversal detector 52 is internal to the signal detector 20b, the detector 52 receives timing and other information from receiver 22 regarding the received signal, and, responsive thereto, detects instances where the signal of interest undergoes a phase reversal at a frame boundary. This information is provided to coherent integrator 30, which uses this information to coherently integrate the product values provided by multiplier 28.

In applications in which the phase reversal detector 52 is external to the signal detector 20b, the phase reversal detector 52 detects phase reversals from a source of information other than the waveform from which the samples are derived. In one example, the phase reversal detector 52 is part of a cellular telephone and detects phase reversals based on timing information provided to it from the base station servicing the telephone in the cellular network.

Coherent integrator 30 receives the product values from multiplier 28, and the phase reversal information from phase reversal detector 52, and, responsive thereto, coherently integrates the product values for a given hypothesis while adjusting for phase reversals that may occur at frame boundaries. The phase reversals must be accounted for to ensure that successive product values subject to the phase reversal add constructively, rather than destructively, to the partial correlation value accumulated from the product data that is not subject to the phase reversal. In one implementation example, this is accomplished by flipping the sign, or polarity, of the samples that are input to multiplier 28 upon the detection of a phase reversal by phase reversal detector 52. However, the method of phase flipping has alternative points of application. For example, at the multiplier 28, the phase flip (negation) could alternatively be applied to the input receiver samples, the Doppler correction signal, or the multiplier output product of the foregoing.

Coherent integrator 30 then provides correlation values for each of the hypotheses generated by hypothesis generator 24, in which each of the correlation values are determined by taking account of the phase reversals detected by phase reversal detector 52.

Figure 5:
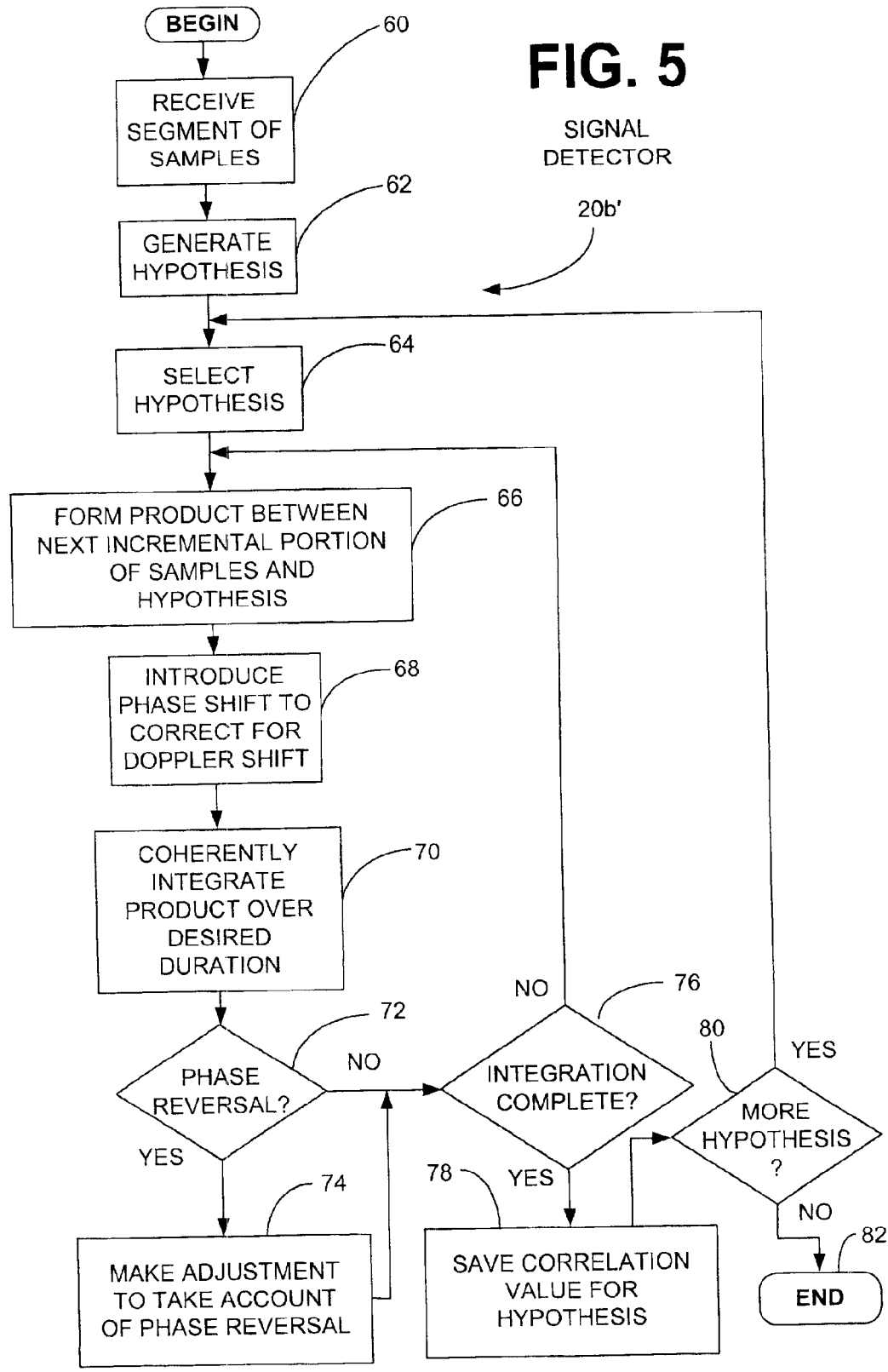
FIG. 5 illustrates a method of operation of the signal detector of FIG. 4.

A method of operation of a signal detector 20b in accordance with the foregoing embodiment is illustrated by way of a flow chart $20b'$ in FIG. 5. As illustrated, the process begins at step 60, in which a segment of samples of a signal is received. Typically, the signal comprises a signal of interest perturbed by noise or pseudo-noise. In addition, the signal of interest is subject to phase reversals at defined frame boundaries.

At step 62, a plurality of hypotheses are generated regarding the signal of interest, or a parameter of the signal of interest. In step 64, one of the hypotheses from step 62 is selected for testing. The received samples are then divided up into incremental portions or subsegments.

In step 66, the product between the next incremental portion of the samples and data representative of the hypothesis selected in step 64 is formed.

In step 68, a phase shift is imposed upon the product data by the Doppler phase correction system 32 (see FIG. 4) in order to offset the inherent Doppler and enhance the correlation as well as later integration.

After step 68, at step 70, coherent integration is performed over the phase shifted product values resulting from step 68.

In step 72, a determination is made whether the ensuing incremental portion of samples is at a frame boundary, and whether there is a phase reversal at the frame boundary. If both conditions are present, step 74 is performed. If not, the process proceeds directly to step 76, bypassing step 74.

At step 74, an adjustment is made to take account of the phase reversal to ensure that subsequent product values add constructively, rather than destructively, to the accumulated integration value. In one embodiment, this step comprises flipping the sign of the ensuing samples until the next phase reversal is detected. The process then proceeds to step 76.

In step 76, a determination is made whether the integration is complete for the selected hypothesis, that is, whether there are any remaining incremental portions of the received samples that remain to be processed for the selected hypothesis. If the integration is not complete, the process jumps to step 66, and the process repeats itself beginning at this point. If the integration is complete for the hypothesis, step 78 is performed. In step 78, a correlation value for the hypothesis is derived from the integration, and stored. Step 80 is then performed. In step 80, a determination is made whether there are more hypotheses to be tested. If so, a jump is made to step 64, and the process beginning at this point is repeated for the next hypothesis to be tested. If not, the process ends 82.

Figure 6:
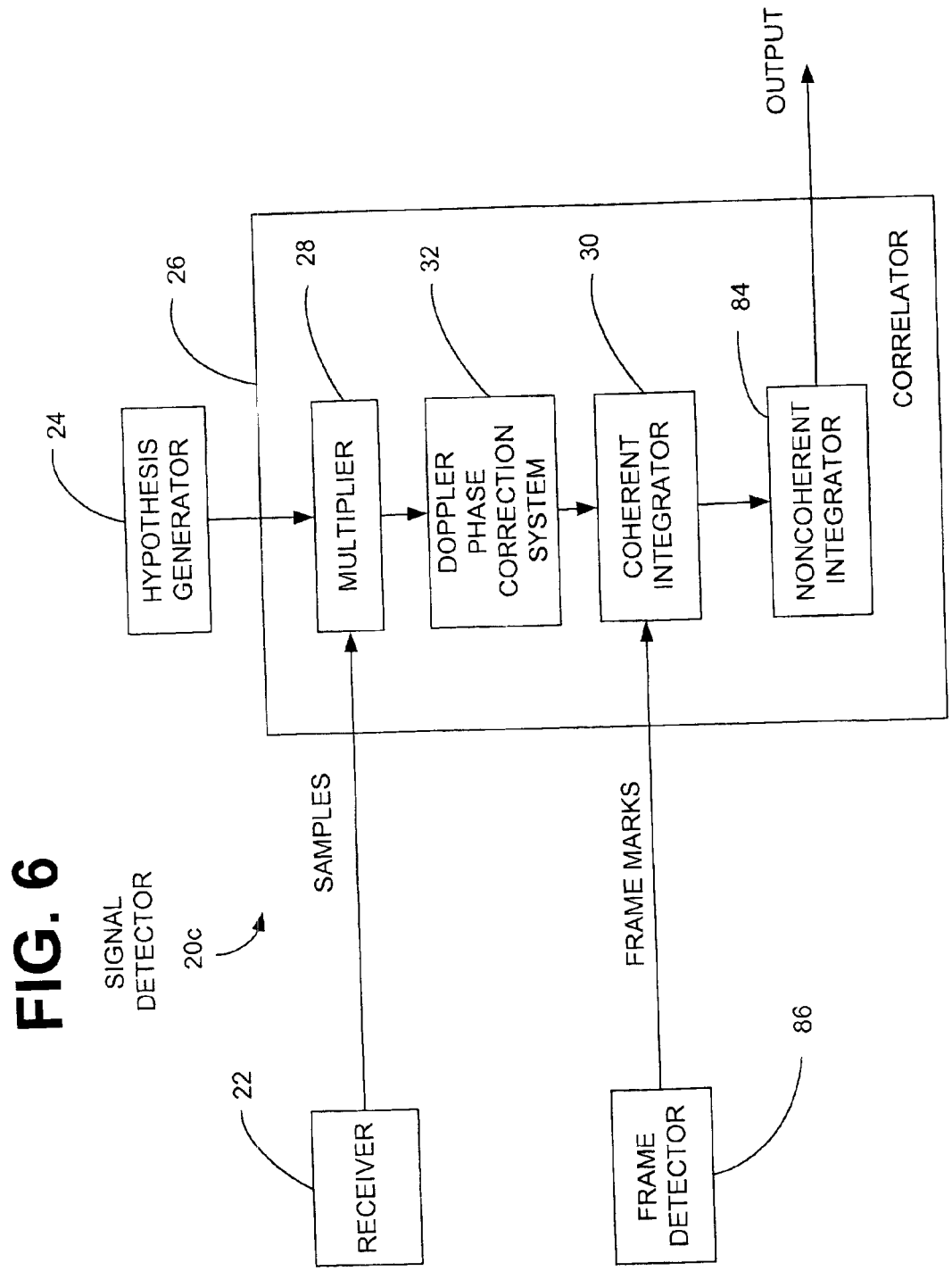
FIG. 6 illustrates a further embodiment of a signal detector employing the Doppler phase correction system of the present invention.

A further embodiment of a signal detector is illustrated in FIG. 6 and is generally denoted by reference numeral 20c. In this signal detector 20c, receiver 22 receives a signal which, as in the FIG. 4 embodiment, comprises a signal of interest perturbed by noise or pseudo-noise, and is subject to phase reversals at defined frame boundaries. The receiver 22 provides multiplier 28 with samples of the signal.

Hypothesis generator 24 generates a plurality of hypotheses for testing.

Correlator 26 comprises multiplier 28, Doppler phase correction system 32, coherent integrator 30, and noncoherent integrator 84. Multiplier 28, responsive to the hypotheses from hypothesis generator 24 and the samples from receiver 22, produces data representative of the product or sum of products of the samples and data representative of each of the hypotheses to be tested.

A frame detector 86 is also provided, either physically internally, as part of the signal detector 20c, or externally, for example but not limited to, as part of a cellular telephone or wireless communications device. In an implementation in which the frame detector 86 is internal to the signal detector 20c, the frame detector 86 receives timing information from the receiver 22, and, responsive thereto, detects the boundaries between frames, and provides a signal to coherent integrator 30 containing this information. In an implementation in which the frame detector is external to the signal detector 20c, the frame detector 86 receives timing information from a source other than the waveform from which the samples are derived. In one implementation example, this timing information is obtained from equipment associated with a cellular network or other wireless network.

Coherent integrator 30 receives the product values from the Doppler phase correction system 32 and the information about frame boundaries from frame detector 86, and, responsive thereto, coherently integrates the product values for a given hypothesis up to a frame boundary. When a frame boundary is detected, the partial integration value is stored in a temporary location for the hypothesis, and then the partial integration value reset for the hypothesis. Coherent integration is then resumed for the samples on the other side of the frame boundary. If another frame boundary is detected, the foregoing is repeated. This procedure is repeated for each of the hypotheses to be tested.

At this point, there are a plurality of integration values stored for each hypothesis, with each of the integration values representing the coherent integration of product values between, but not crossing, frame boundaries. This information is then provided to noncoherent integrator 84. Noncoherent integrator 84 receives this information, and, responsive thereto, noncoherently combines the coherent integration values for a given hypothesis. In one implementation, each of the integration values has a real and an imaginary component, and the magnitude of the integration value is obtained by, in effect, computing the square root of the sum of the squares of the real and imaginary components. The magnitude values for a given hypothesis are then added together to arrive at a correlation value for the hypothesis. The foregoing procedure is then repeated for each of the hypotheses.

Figure 7:
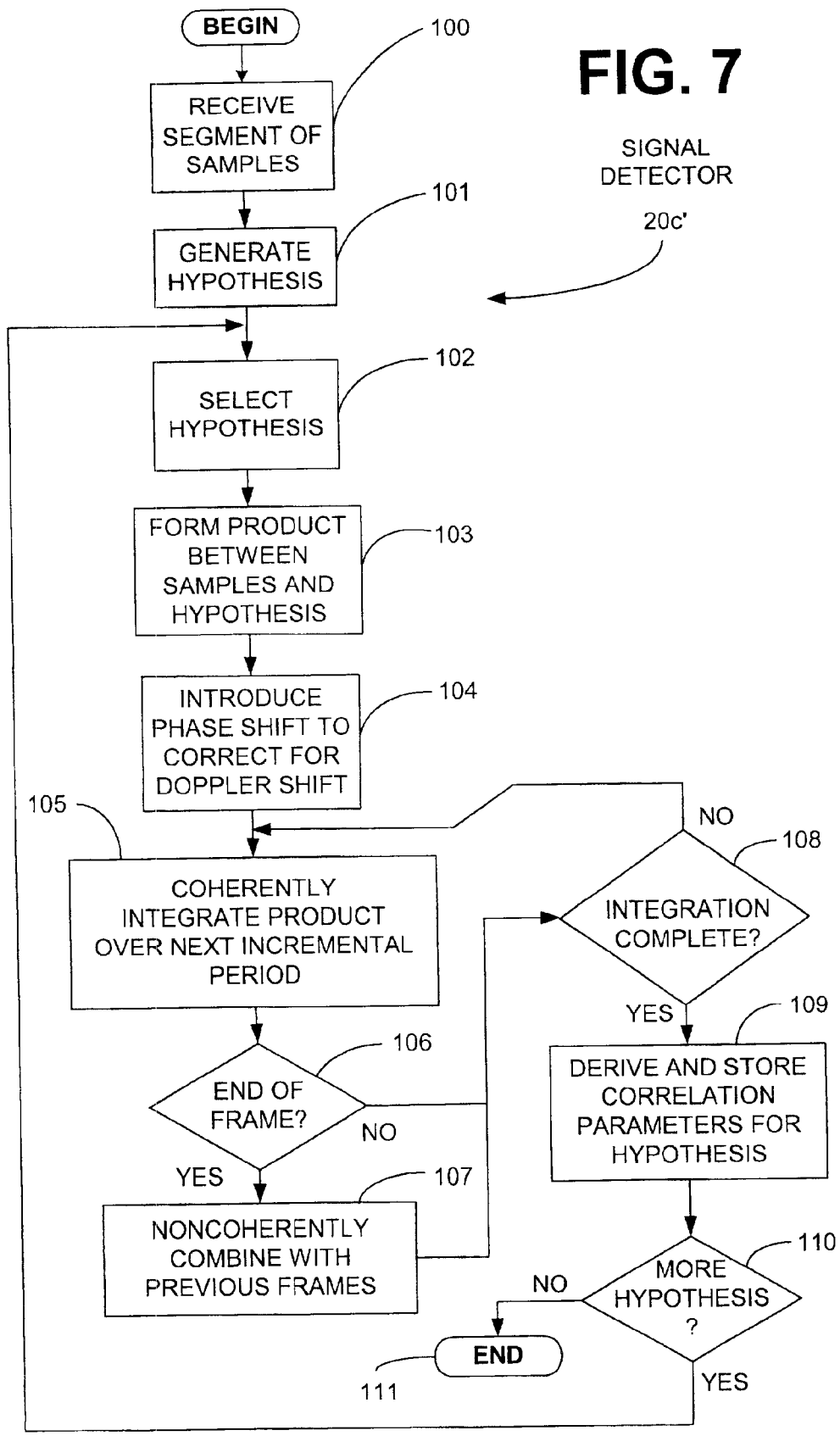
FIG. 7 illustrates a method of operation of the signal detector of FIG. 6.

A example of a method of operation of the signal detector 20c in accordance with this embodiment is illustrated in FIG. 7 by way of a flow chart 20c'. Initially, at step 100, a segment of samples of the signal is received. In step 101, a plurality of hypotheses regarding the signal of interest are generated. Al step 102, one of the hypotheses is selected. In step 103, the product between the samples and data representative of the hypothesis is formed. The resulting product values are then divided up into a plurality of incremental portions, or subsegments.

Next, at step 104, a phase shift is imposed upon each of the subsegments using the Doppler phase correction system 32 (see FIG. 6) in order to offset the Doppler shift that is inherent in the data.

In step 105, the next incremental portion of phase shifted product values for the selected hypothesis are coherently integrated. In step 106, a determination is made whether a frame boundary has been detected. If so, step 107 is performed, then followed by step 108. If not, step 107 is bypassed, and step 108 is performed directly.

In step 107, the current integration value for the hypothesis is noncoherently combined with any previous integration values obtained for previous frames. In one implementation, the magnitude of the current integration value is obtained by taking the square root of the sum of the squares of the real and imaginary components thereof, or equivalently, the sum of the squares of the real and imaginary components. This value is then added to the magnitudes which have been derived for the hypothesis for previous frames.

In step 108, a determination is made whether the integration has been completed for the current hypothesis. If not, a jump is made to step 105, and the process repeated at this point for the next incremental portion of product values. If so, the process ends.

At the conclusion of the process, a plurality of correlation values are available, with a correlation value corresponding to each of the hypotheses tested.

It is contemplated that the foregoing signal detectors 20a, 20b, 20c (referred to as "20" jointly or severally depending upon the context, in FIGS. 2, 4, 6, respectively) employing the Doppler phase correction system 32 (FIGS. 2, 4 or 6) can be beneficially employed in a variety of applications, such as in a global positioning system (GPS; e.g., NAVSTAR, GLONASS, etc.) receiver. The Doppler phase correction system 32 is particularly applicable to low C/No or duty cycled, low power operation applications of a GPS receiver in which the GPS waveform is not tracked continuously, but only intermittently. In applications such as this, information about bit synchronization, the location of data epochs (see DE in FIG. 9), and phase reversals at the data epochs is not directly available from the GPS waveform itself, but must be derived from another source, such as a cellular telephone network, base station computer, or a local clock periodically synchronized with the very accurate atomic clocks maintained on the GPS satellites.

B. GPS Receiver

Figure 1:
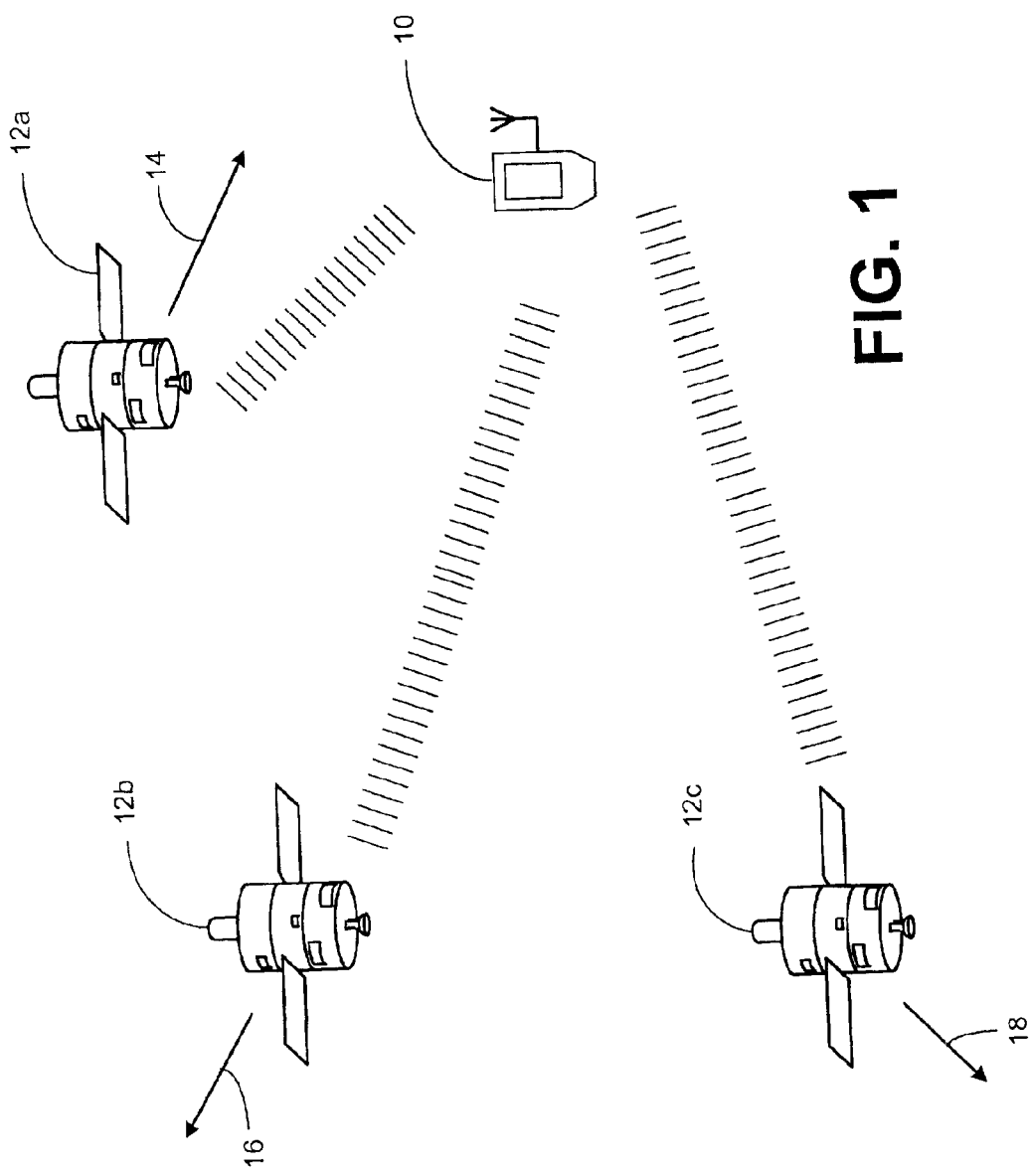
FIG. 1 illustrates an example environment for operation of a global positioning system (GPS) receiver.
Figure 8:
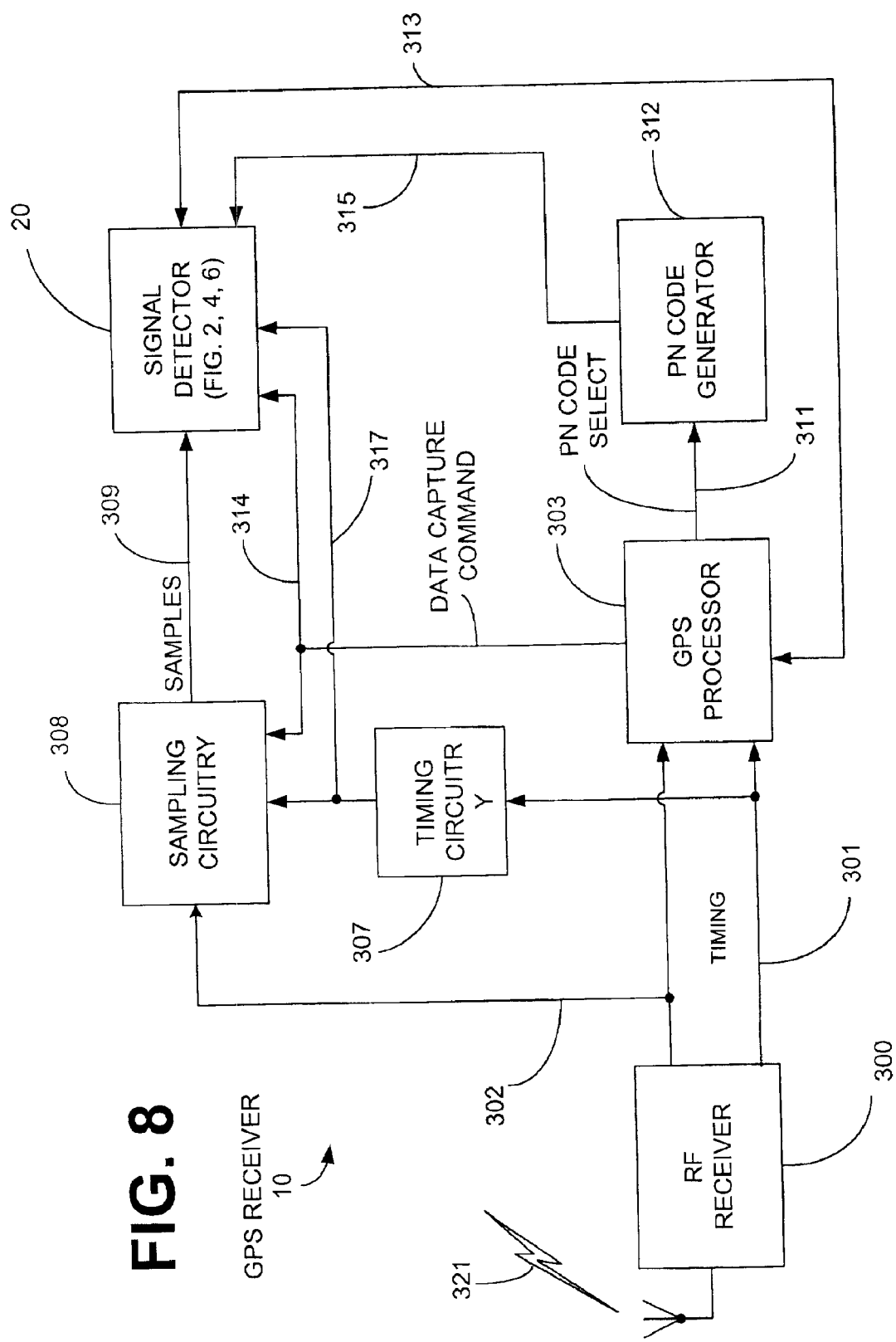
FIG. 8 illustrates an embodiment of a GPS receiver employing the Doppler phase correction system of the present invention.

One example of an embodiment of a GPS receiver 10 employing the Doppler phase correction system 32 (see FIG. 2, FIG. 4, and FIG. 6) in accordance with the subject invention is illustrated in FIG. 8. As shown, the GPS receiver 10 (see also FIG. 1) comprises a radio frequency (RF) receiver 300, sampling circuitry 308, timing circuitry 307, a PN code generator 312, a signal detector 20, and a GPS processor 303, for example, a microprocessor. The RF receiver 300 receives a plurality of signals, each from a satellite visible to the RF receiver 300.

Figure 9:
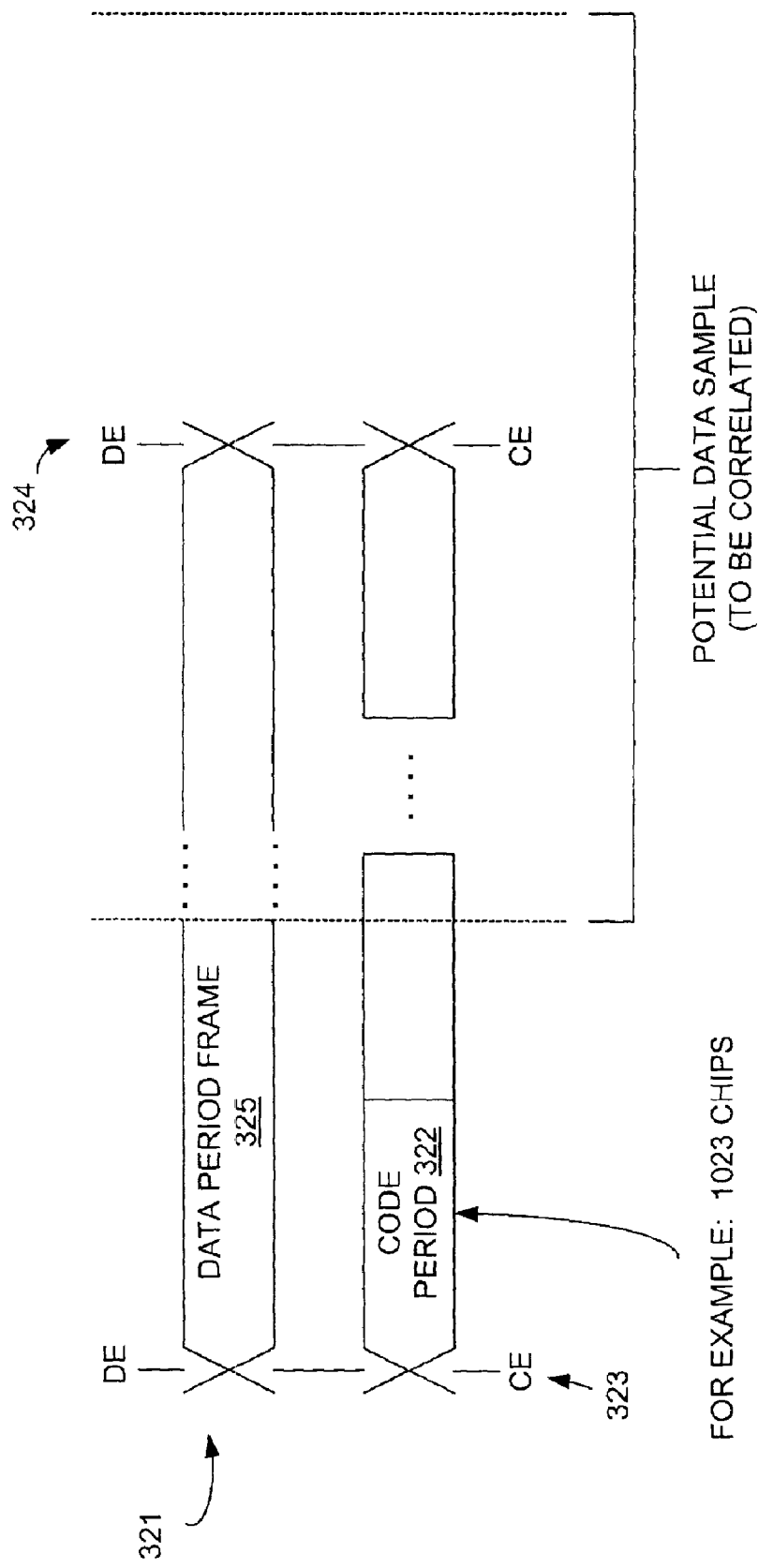
FIG. 9 illustrates the signal format of a GPS signal that is communicated by a GPS satellite to the GPS receiver of FIG. 8.

The format of each satellite signal is depicted in FIG. 9. As is well known in the art, each satellite signal 321 comprises, among other things, a repeating PN code unique to the satellite. Each period 322 of the PN code comprises 1023 bits, or "chips," which repeat every 1 millisecond (ms), for a nominal chip rate of 1.023 MHz. The point of demarcation between successive code periods is called a "code epoch," which is denoted by reference numeral 323 (CE).

Each satellite signal 321 is also modulated with a 50 Hz data signal. More specifically, every twentieth code epoch 323 corresponds to a data epoch (DE) 324, where a new frame 325 begins. The frames 325 are coded via differential phase shift keying (PSK), where successive frames 325 change phase (phase reversal by 180 degrees) to indicate one logic state (1 or 0) or remain in the same phase relationship (0 degrees phase shift) to indicate another logic state. Thus, a frame 325 includes 20 code periods 322 (20 ms), each frame 325 is separated by a data epoch 324, and each code period 322 is separated by a code epoch 323. One purpose, among others, of the 50 Hz data signal encoded on signal 321 is to convey locational information about the satellite to the receiver 10.

Returning now to FIG. 8, the RF receiver section 300 demodulates the received signal 321 to remove the carrier and obtain a baseband signal which is provided to the sampling circuitry 308 over signal connection 302. The sampling circuitry 308 provides, responsive to timing signals produced by the timing circuitry 307, a segment of samples of the baseband signal taken over a defined sampling window. The segment of samples is provided to the signal detector 20a, 20b, or 20c (FIGS. 2, 4, 6, respectively) over signal connection 309. The applicable signal detector 20 processes the segment of samples in accordance with a plurality of PN code, PN code phase, and Doppler shift hypotheses for each of the satellites.

Figure 11:
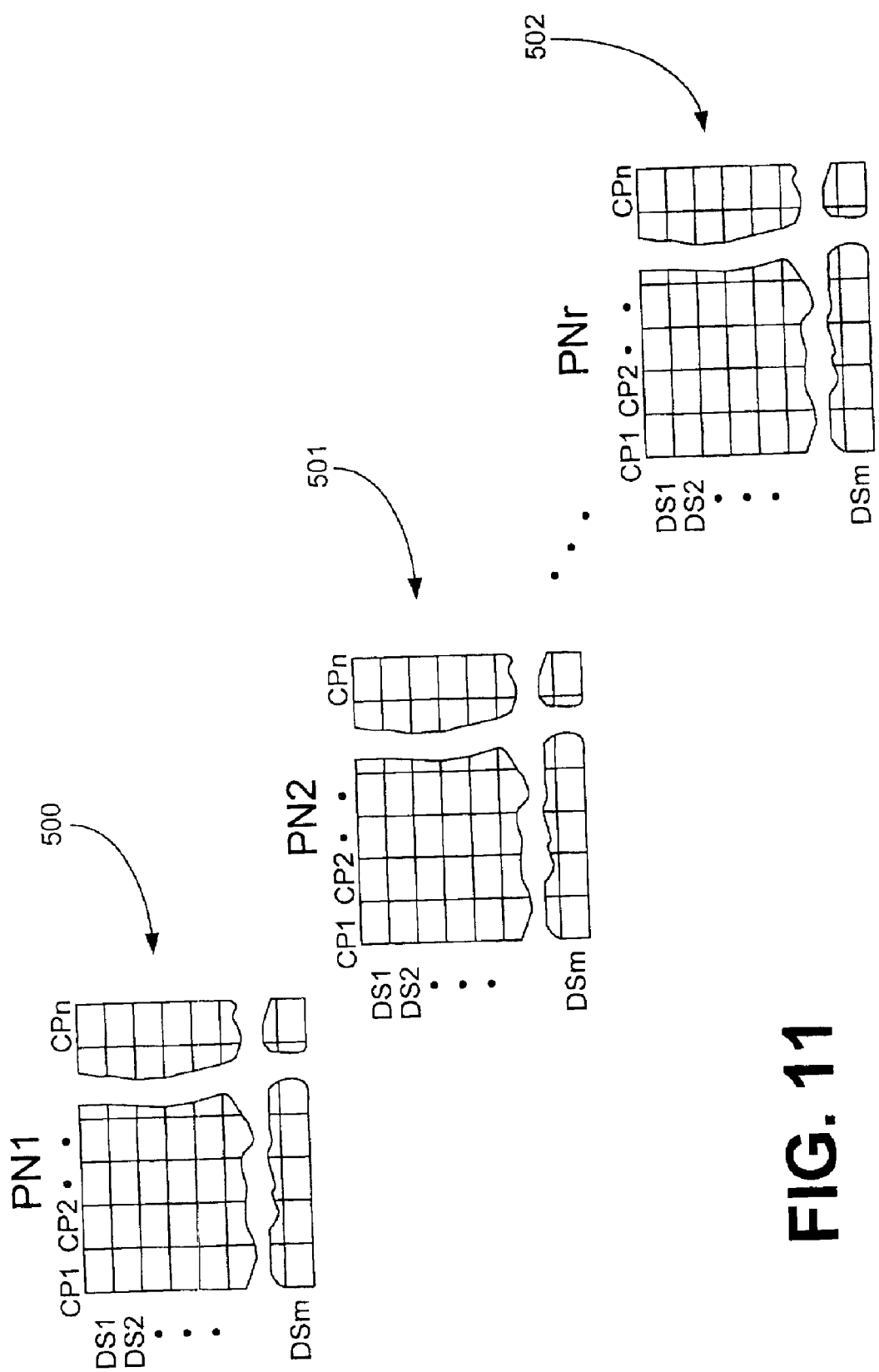
FIG. 11 illustrates the data structures output by the matched filter of FIG. 9.

In one implementation, as illustrated in FIG. 11, for each segment of samples, the applicable signal detector 20 outputs a plurality of correlation arrays 500, 501, 502 of data derived from the segment of samples. According to this implementation, each array 500, 501, 502 corresponds to a PN code hypothesis, PN1, PN2, . . . PNr, each row of an array 500, 501, 502 corresponds to a Doppler shift hypothesis, DS1, DS2, . . . DSm, each column of an array 500, 501, 502 corresponds to a code phase hypothesis, CP1, CP2, . . . CPn, and each entry in an array 500, 501, 502 is a measure of the degree to which the combined PN code, Doppler shift, and PN code phase hypothesis corresponding to the entry correlates to the samples. Thus, in FIG. 11, reference numeral 500 identifies a correlation array corresponding to PN code hypothesis PN1; reference numeral 501 identifies a correlation array corresponding to PN code hypothesis PN2; and reference numeral 502 identifies a correlation array corresponding to PN code hypothesis PNr.

Referring again to FIG. 8, the PN code generator 312 generates the PN code hypotheses which are provided as inputs to the signal detector 20 over signal connection 315.

In one embodiment, the Doppler shift hypotheses are generated internally within the signal detector 20. The GPS processor 303 issues data capture commands on signal connection 314 to the sampling circuitry 308 and the signal detector 20. Each data capture command directs the sampling circuitry 308 to capture a segment of samples, and also directs the signal detector 20 to process the segment of samples. The timing circuitry 307 generates, responsive to first timing signals provided by receiver 300, second timing signals which are provided as inputs to the sampling circuitry 308 and the matched filter 310. In one implementation, the first timing signals generated by the RF receiver 300 are generated by a local oscillator within the RF receiver, and define a local time base which is related to the time base maintained by the GPS satellites.

In one example of an embodiment, the correlation arrays for a segment are grouped by PN code hypothesis, and by Doppler shift hypothesis for a given PN code hypothesis. The result is that each grouping corresponds to a particular combination of PN code hypothesis and Doppler shift hypothesis. In one implementation example, the correlation arrays corresponding to a satellite are used to detect the presence and range of the satellite. Typically, this occurs when the correlation data for a particular set of hypotheses is significantly greater than the correlation data for alternative hypotheses.

1. Matched Filter

Figure 10:
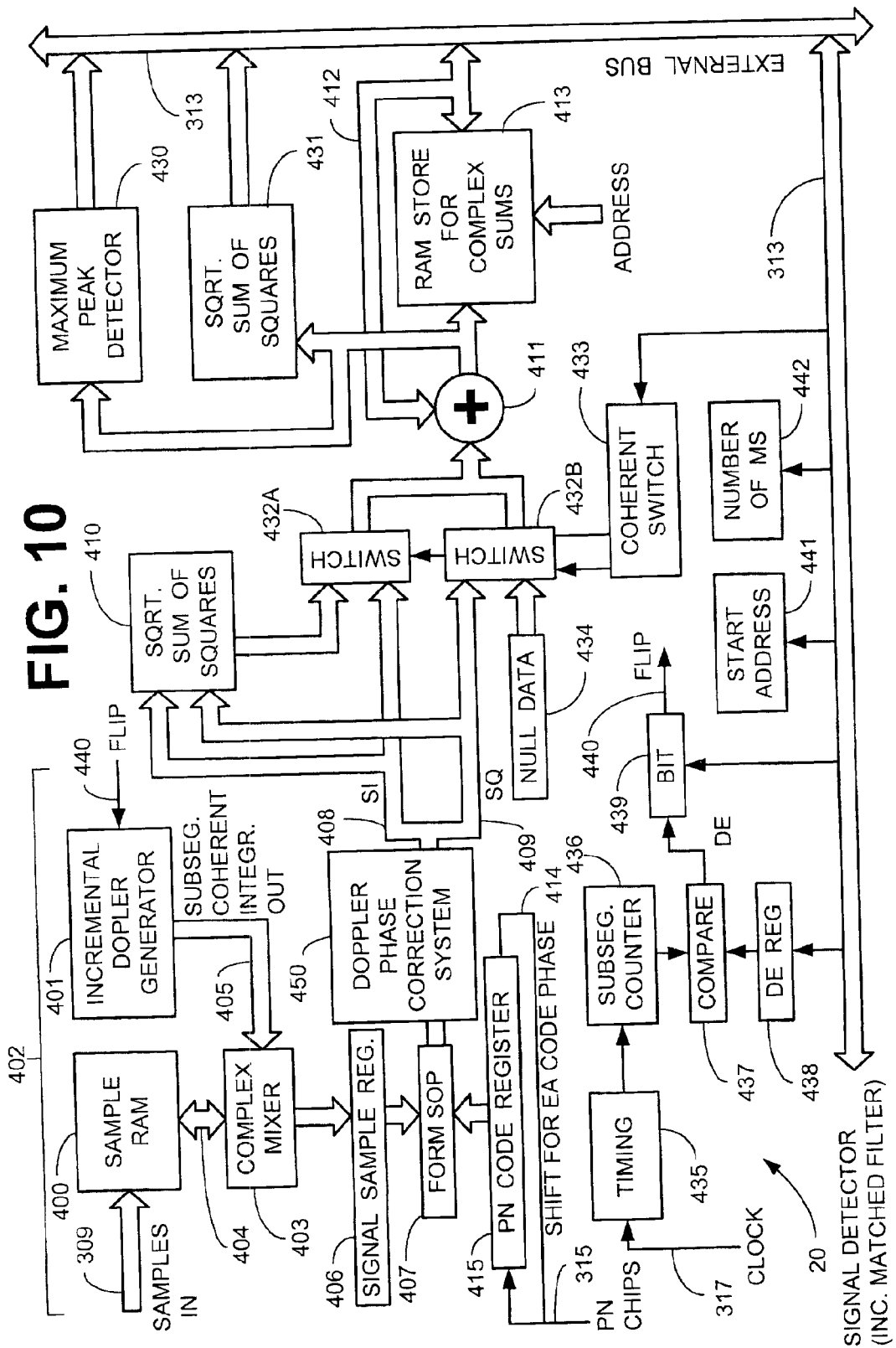
FIG. 10 illustrates an embodiment of a matched filter and coherent/noncoherent integrator in the GPS receiver of FIG. 8.

FIG. 10 illustrates an embodiment of the signal detector 20 (FIG. 8) that includes a correlator 26 (FIG. 2, 4, 6) having both a coherent integrator 30 (FIGS. 4, 6) and a noncoherent integrator 84 (FIG. 6). The correlator 26 is implemented as a matched filter 402 (FIG. 10), which is well known in the art. An example of a matched filter is described in U.S. patent application having Ser. No. 09/145,055, filed Sep. 1, 1998, and entitled, "DOPPLER CORRECTED SPREAD SPECTRUM MATCHED FILTER." As illustrated in FIG. 10, this embodiment of the matched filter 402 comprises random access memory (RAM) 400 which is configured to receive a segment of samples from sampling circuitry 308 (FIG. 8) over signal connection 309 (see also FIG. 8). In one implementation example, a segment is 20 ms in duration, the same as the frame duration, and the RAM 400 is configured to receive one 20 ms segment of samples at a time. According to this implementation example, each 20 ms segment of samples comprises 40920 samples, obtained by sampling the baseband signal at a nominal sampling rate of 20.46 MHz, and then performing decimation filtering. Note that, in this implementation example, although a segment has the same duration as a frame, in general, frame boundaries will not occur synonymously with segment boundaries, and in fact, will typically occur between segment boundaries.

Each sample is a complex sample having an in-phase (I) component and a quadrature (Q) component, each comprised of any suitable number of data bits, which can be represented in complex mathematical form as follows: I+jQ. In one implementation example, each component is 3-level and can take on the values −1, 0, and +1, and thus can be represented with 2 bits. In this implementation example, each input sample can be represented with 4 bits, and a 20 ms frame of samples requires 40, 920×4 bits=163 K bits of RAM 400 for the storage thereof In this implementation example, the matched filter 402 of FIG. 10 is configured to divide up the segment of samples into 1 ms incremental portions or subsegments, the same duration as the PN code period, and to process a 1 ms subsegment at a time. In this implementation example, each 1 ms subsegment of samples comprises 2046 samples (each corresponding to a ½ chip), each having I and Q components, each such component represented by 2 bits.

The matched filter 402 further comprises a complex mixer 403, and incremental Doppler generator 401. In this implementation example, the RAM 400 is configured to provide to complex mixer 403, over signal connection 404, a 1 ms subsegment of samples from the segment stored therein at a time.

Incremental Doppler generator 401 generates a plurality of Doppler shift hypotheses which are provided to complex mixer 403 over signal connection 405 one hypothesis at a time. In one implementation example, the incremental Doppler generator 401 generates Doppler shift hypotheses in the range of ±62,000 Hz, to allow for inaccuracy in the local time base that is not corrected by the input sampling process.

Complex mixer 403 receives a subsegment of samples from RAM 400 over signal connection 404, and a Doppler shift hypothesis from incremental Doppler generator 401, and, responsive thereto, multiplies the samples by a complex phasor of the form $e^{jw^d t}$, where $w^d$ represents the Doppler shift hypothesis provided by incremental Doppler generator 401. A Doppler-corrected subsegment of samples are stored in sample register 406. Additional detail about this procedure is available in U.S. patent application, Ser. No. 09/145,055, filed Sep. 1, 1998, and entitled "DOPPLER CORRECTED SPREAD SPECTRUM MATCHED FILTER," now U.S. Pat. No. 6,044,105, which has been incorporated by reference herein.

At this point in the processing pipeline, each corrected subsegment of samples continues to comprise 2046 complex samples, each having I and Q components, which can be represented in combination as I+jQ, and each is represented as a 5-level value (takes on any one of the discrete values –2, –1, 0, +1, and +2). In this implementation example, each component requires 3 bits for the representation thereof, and thus the 2046 samples in a corrected subsegment requires 2046×6 bits=12,276 bits in register 406 for the storage thereof.

PN code register 408 is provided to store the current PN code hypothesis provided by PN code generator 312 (FIG. 8) over signal connection 315 (see also FIG. 8). In this implementation example, each PN code hypothesis represents one 30 period of a PN code. In one implementation example, the PN code period is 1 ms, and each PN code hypothesis represents 1023 chips which repeats every 1 ms, representing a chip rate of 1.023 MHz. In this implementation example, the PN code register 408 is configured to store 1023 chips at a time.

As indicated by signal connection 409, the PN code register 408 is capable of being circularly shifted by an amount which corresponds to a code phase delay hypothesis. In the implementation example which has been discussed, in which the period of a PN code is 1023 chips, the value of the code phase delay can range from 0 to 2045 half chip increments. The PN code register 408 is configured in this implementation example to be circularly shifted by any number or fraction of chips which correspond to a code phase delay hypothesis under consideration.

The sum of products (SOP) circuitry 407 is connected to the signal sample register 406 and the code register 408. The SOP circuitry 407 is configured to form the coherent integration of the product between the subframe of corrected samples stored in sample register 406 and the PN code hypothesis stored in the PN code register 408. In the current implementation, half chip shifts are made by multiplexing the code chips between one of two adjacent signal samples. Thus, the shift is really done by multiplexing the data samples (spaced at half chip internals) over by one position representing a half code chip.

In the implementation example discussed earlier in which the subsegment of samples stored in sample register 406 comprises 2046 samples, each having I and Q components, and the PN code hypothesis stored in PN code register 408 comprises 1023 chips, a correspondence is present between two of the samples in the sample register 406, and one of the chips in PN code register 409. The I and the Q components of each of the two samples is multiplied by the corresponding PN chip. Then, the sum of the I component products is determined, and the sum of the Q component products is separately determined. The sum of the I component products is output on signal connection 414, and the sum of the Q component products is output on signal connection 415.

In equation form, the function of the SOP circuitry 407 in this implementation example can be represented as follows:

$$SI = \sum_{i=1}^{1023} CHIP_i \times (I_i^1 + I_i^2) \qquad (1)$$

$$SQ = \sum_{i=1}^{1023} CHIP_i \times (Q_i^1 + Q_i^2) \qquad (2)$$

where $CHIP_i$ is the ith chip in the PN code hypothesis, $I_i^1$ is the I component of the first of the two samples corresponding to $CHIP_i$, $I_i^2$ is the I component of the second of the two samples corresponding to $CHIP_i$, $Q_i^1$ is the Q component of the first of the two samples corresponding to $CHIP_i$, and $Q_i^2$ is the Q component of the second of the two samples corresponding to $CHIP_i$.

The matched filter 402 is capable of two modes of operation controlled by the state of coherent switch 433. The state of coherent switch 433 can be set to either "0" or "1" by GPS processor 303 (FIG. 8). In a first mode of operation, defined when the state of switch 433 is set to "1", the matched filter 402 is configured to coherently integrate the SI and SQ values which have been computed with corresponding SI and SQ values determined for previous subsegments. In a second mode of operation, defined when the state of switch 433 is set to "0", the matched filter 402 is configured to non-coherently integrate the SI and SQ values which have been computed with corresponding SI and SQ values for previous subsegments.

The state of switch 433 controls the state of switches 432a and 432b. When switch 433 is set to "1", switches 432a and 432b are configured to pass directly to complex adder 411 the SI and SQ values from signal connections 414 and 415, respectively. When switch 433 is set to "0", switches 432a is configured to pass the output of sqrt. of sum of squares circuit 410 to complex adder 411, and switch 432b is configured to provide a null value to complex adder 411.

Complex adder 411 is configured to perform a complex addition of the two complex values provided at its two inputs, and to store the result in complex RAM 413. One of the inputs to complex adder 411 is provided from complex RAM 413 over signal connection 412. The other input is provided from switches 432a and 432b. The square-root (Sqrt.)-of-sum-of-squares circuit 410 is configured to receive the SI and SQ values on signal connections 414 and 415 respectively, and to compute the square root of the sum of the squares of these two values. In equation form, the circuit computes the value:

$$SS = \sqrt{(SI)^2 + (SQ)^2}. \qquad (3)$$

Sqrt.-of-sum-of-squares circuit 431 is configured to receive a complex number from complex RAM 413 and compute the magnitude thereof, that is, the square root of the sum of the squares of the real and imaginary components thereof, or equivalently, the sum of the squares of the real and imaginary components. The result can then be stored back in complex RAM 413 through bus 313.

Note that, in connection with the circuit 431, there are other alternatives that can be used and could have advantages in various circumstances. The sum of the squares can be implemented, without the square root function. This is theoretically better, although a wider dynamic range into the RAM is needed, and wider words scaled appropriately are also needed. The approximation SS=|Max|+½|Min| can also be used for SQ and SI, where Max is the larger of SQ and SI and Min is the lesser of SQ and SI. This approximation can be less circuitry and processor effort in some cases.

Peak detector 430 is configured to receive a plurality of correlation values from RAM 413, and, responsive thereto, select a maximum thereof. Once selected, the maximum value is provided to connection 313 (bus), where it can be provided to GPS processor 303 and/or to complex RAM 413.

In an alternative embodiment, the peak detector 430 determines a set, for example, 8, of the largest values. There is an advantage to locating more than just the maximum value in the correlation array. The maximum is the estimated received code phase to within a half chip. The two adjacent values are used to refine the code phase estimate. However, other large values are an indication of multi-path and cross correlation signals. These can trigger additional tests to further qualify the estimated code phase that has been detected. The locations of the 8 largest values can be stored in an ordered list, with the location of the largest first, and then the next largest and so on. The foregoing implementation and process helps reduce processor loading.

Timing circuitry 307 from FIG. 8 provides a clock to timing circuit 435 over signal connection 317. Responsive thereto, timing circuit 435 generates a timing pulse for every subsegment. Counter 436 receives the timing pulses from timing circuit 435, and responsive thereto, counts the number of subsegments which have been processed by the matched filter 402 of FIG. 10. Register 438 stores the subsegment number at which the next frame boundary will occur. It is configured to be loaded with this number by GPS processor 303 over bus 313. In one implementation, in which a segment duration is 20 ms, and the subsegment duration is 1 ms, a segment boundary will occur every 20 subsegments.

Bit circuitry 439 is configured to store the value of the data signal modulated onto the signal of interest beyond the next frame boundary. It is configured to be loaded with this value by GPS processor 303 over bus 313. Bit circuitry 439 is also configured, responsive to the detection of a frame boundary by compare circuit 437, and the state of the next data bit, to determine whether there will be a phase reversal in the signal 323 (FIG. 9) of interest at the segment boundary. If the data signal does not change state at the frame boundary, then there will not a phase reversal at the frame boundary. Conversely, if the data signal changes state at the frame boundary, there will be a phase reversal at the frame boundary.

If there is a frame reversal at the frame boundary, the flip signal output from the bit circuitry 439 is asserted. This flip signal 440 is also provided as an input to incremental Doppler generator 401. Responsive to the assertion of this signal, incremental Doppler generator 401 flips the sign of the complex phasor that is multiplied by the current subsegment of samples by complex mixer 403. Thus, if the sign of the phasor is positive, and the flip signal 440 is then asserted, the sign of the complex phasor will become negative. In equation form, the complex phasor will go from $e^{jw_d t}$ to $-e^{jw_d t}$. Conversely, if the sign of the phasor is negative, and the flip signal 440 is then asserted, the complex phasor will go from $-e^{jw_d t}$ to $e^{jw_d t}$. When the modified phasor is multiplied by the incoming samples by complex mixer 403, a phase reversal of the samples is implemented to counteract the phase reversal caused by the change of state of the data signal at the frame boundary.

Note that the flip does not need to be applied to an entire 1 ms subsegment. The code epochs (CE) occur at one specific code phase of the code as defined in the GPS system. When the code is loaded into the code register 408, the chip representing the CE is at the end of the code register 408 (shift register). Hence, for this code phase, the flip would apply to the entire 1 ms of data. When the code chips are cyclically shifted, the position of the code epoch (and therefore the potential location of a data epoch, DE) is within the array. Hence, by flipping the sign of the entire array, some portion of that array is destructively integrated. This is acceptable because, at worst, the resulting error can be arranged to be no more than ½ ms. This represents a maximum signal loss of 1 ms out of 20, or on the order of 20 log 10 (19/20)=−0.45 dB. The average loss would be about half that of 20 log 10 (39/40)=−0.22 dB.

With this consideration, it is also apparent that the flip can be accomplished at the output of the SOP 407, since all data for a given 1 ms is either negated, or not. This could be accomplished, for example, by allowing the adder 411 be an adder/subtractor. These alternatives are the logic designer's choice, made to minimize power, area, delay, or whatever the limiting design issue turns out to be.

There is also a way to implement a phase flip that travels with the cyclically shifting code chips. The flip bit is disposed at the end of the code register 408, and an XOR logic operation is performed on the code chips when they are shifted around to the other end of the register 408. The XOR operation is only done if the flip bit is asserted. That way the flip would travel around with the CE boundary. This functionality can be accomplished with less logic than the other alternatives. Note that the flip is only applied once and then the chips are left flipped. It is possible that an XOR gate(s) could be disposed at the shift register input, so the chips can be loaded in an already inverted state. That is needed to continue an inverted process in a later 20 ms data capture. With reference to FIG. 10, to add this feature, an XOR gate(s) is inserted in connection 315 for PN code register 408 loading and in connection 409 for cyclic shifting. The flip bit output, as currently drawn, can be used to control the XOR gate(s). The operation is a little different, in that there might have to be a special value to make the compare fire during PN loading and the flip bit is only on for on segment, while the compare is "equal" rather than "equal or greater" as in the present concept.

The data epoch timing and data bit values stored respectively in DE register 438 and bit circuitry 439 is typically derived from a source other than the GPS waveform from which the samples stored in RAM 400 are derived.

In one embodiment, this information is derived from an accurate clock maintained in the GPS receiver 10 (FIG. 8) and periodically synchronized with the atomic clocks maintained on the GPS satellites to preserve data epoch timing and data values.

In another embodiment, the GPS receiver 10 would be normally operated in a continuous mode of operation, and then switched to an intermittent mode of operation when low power operation is desired or the C/No value of the received signal is low, such as the case in which the receiver enters a building. A local clock would be synchronized with the atomic clocks maintained at the GPS satellites to provide accurate data epoch timing and data values when the GPS receiver 10 is operating in the continuous tracking mode of operation. The local clock would be capable of providing accurate information about data epoch timing and data values during the time the receiver is operated in an intermittent mode of operation.

In another embodiment, this information is derived from another source external to the GPS receiver 10, such as a cellular or wireless (including GPS) telephone network or base station. Cellular or wireless networks commonly track the GPS satellites, and are capable of providing this information to a GPS receiver 10.

In yet another embodiment, the GPS receiver 10 would be periodically operated in a continuous tracking mode of operation to collect ephemeris and almanac data. Ephemeris collection takes 18 seconds and must be done about once an hour. Almanac collection take 6 seconds each and must be collected weekly for each of the 24 satellites. The almanac data is normally constant for a week time and ephemeris data is normally constant over a period of one hour. Consequently, once this information is collected, it can be used to predict data phase changes as a function of time.

There is one aspect that should be considered in this method. Although the ephemeris data normally changes at the top of each hour and the almanac data changes at a known time of the week, the GPS system allows for arbitrary times of changes when necessary. These events normally occur when the GPS control segment uploads new data to the satellites. These uploads occur when the satellites pass over the uplink ground stations, which is typically not at the normal changeover times. Therefore, unexpected changes in the data needs to be accounted for.

Registers 441 and 442 are used to store, respectively, the start address of the samples in the segment of samples stored in RAM 400 that integration is to start at, and the number of ms that the integration is to proceed over. These two registers are loadable by GPS processor 303 over bus 313. Together, they are used to define an arbitrary portion of the current segment over which integration is to proceed.

In a first mode of operation, switch 433 is set to "1", indicating that coherent integration is to be carried out. A segment of complex samples is stored in RAM 400. One subsegment at a time, the samples are multiplied by a complex phasor to correct for Doppler shift and stored in sample register 406. The samples are then multiplied by the PN code stored in register 408, and the SI and SQ sum of products values computed by circuitry 407. The SI and SQ values are then provided over signal connections 414 and 415 respectively, and added by complex adder 411 to any corresponding values previously stored in complex RAM 413 for previous subsegments of the segment stored in RAM 400.

If the subsegment under consideration and stored in sample register 406 is the first subsegment for the segment of interest, the foregoing values are stored in an array entry in RAM 413 corresponding to the combination of the PN code, Doppler shift, and code phase hypotheses under consideration. The arrays are of the same format as those depicted in FIG. 11 and will eventually become the correlation arrays for the current segment of samples in RAM 400. If the subsegment under consideration and stored in sample register 406 is not the first subsegment analyzed for the segment of interest, there may already be a value derived from a previous subsegment stored in RAM 413 in the entry corresponding to the combination of the PN code, Doppler shift, and code phase hypotheses under consideration. In this case, the SI and SQ values determined above are added by adder 411 to the previously stored values for the entry which are provided to the adder 411 over signal connection 412. The result is then stored in lieu of the previously stored values in the array entry corresponding to the combined PN code, Doppler shift, and code phase hypotheses. This process is illustrated in FIGS. 11 and 12.

2. Correlation Arrays

As illustrated in FIG. 11, a plurality of correlation arrays 500, 501, 502 are established in the RAM 413. According to this implementation, each array 500, 501, 502 corresponds to a PN code hypothesis, PN1, PN2, . . . PNr, each row of an array 500, 501, 502 corresponds to a Doppler shift hypothesis, DS1, DS2, . . . DSm, each column of an array 500, 501, 502 corresponds to a code phase hypothesis, CP1, CP2, . . . CPn, and each entry in an array 500, 501, 502 is a measure of the degree to which the combined PN code, Doppler shift, and PN code phase hypothesis corresponding to the entry correlates to the samples. Thus, in FIG. 11, reference numeral 500 identifies a correlation array corresponding to PN code hypothesis PN1; reference numeral 501 identifies a correlation array corresponding to PN code hypothesis PN2; and reference numeral 502 identifies a correlation array corresponding to PN code hypothesis PNr.

Figure 12:
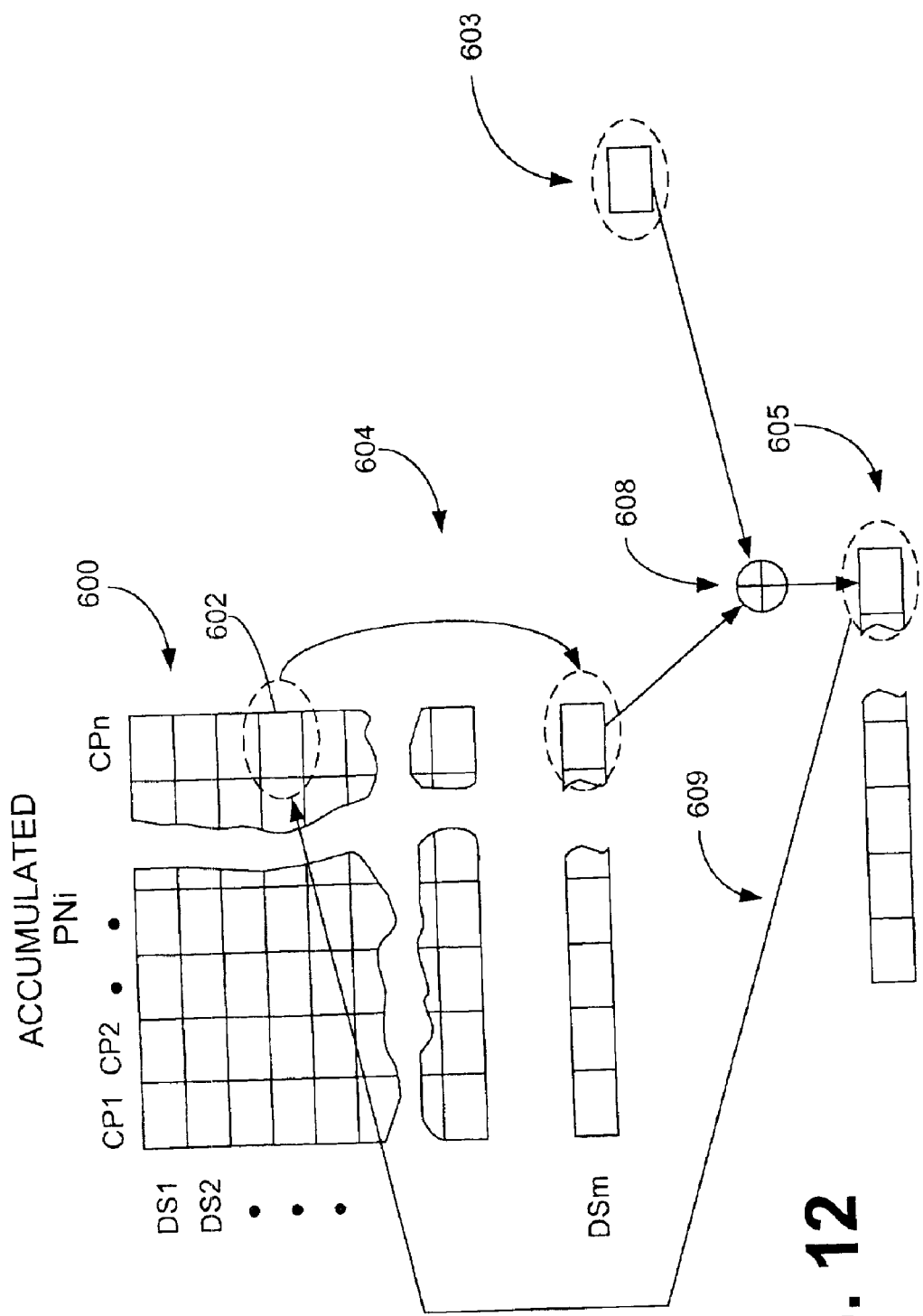
FIG. 12 illustrates the method of updating data structures in the matched filter of FIG. 9.

Referring to FIG. 12, an array 600 represents cumulative values which are stored in RAM 413 for previous subsegments of the segment under consideration. Numeral 603 identifies SI and SQ values derived from the current subsegment for a particular PN code, Doppler shift, and code phase hypothesis. The FIG. illustrates the procedure for updating the cumulative SI and SQ values for entry 602 in array 600 with the corresponding values identified by numeral 603. These cumulative values are retrieved, as indicated by identifying numeral 604, and then added to the corresponding values identified by numeral 603. This addition step is identified by numeral 608. The resulting values, identified by numeral 605, are then restored in lieu of the original values stored in entry 602. This procedure is identified by numeral 609 in FIG. 12.

The next code phase hypothesis is then selected, and the PN code register 408 (FIG. 10) circularly shifted in accordance with the selected code phase hypothesis. The foregoing process is then repeated for the next code phase hypothesis. This process continues for each of the code phase hypotheses which are desired to be tested for the current PN code and Doppler shift hypotheses. In one implementation, 2046 code phases are tested for each 1 ms subsegment, corresponding to the repetition period of the PN codes. In this implementation, the code phase hypotheses which are tested range from 0 to 2045 half-chip increments, and the next code phase hypothesis is selected simply by circularly shifting the PN code register 408 by one-half chip.

The foregoing process is repeated for each of the PN code and Doppler shift hypotheses to be tested. In this manner, the arrays of correlation values stored in RAM 413 (FIG. 10) are incrementally updated with the values derived for the current subsegment. When all the desired hypotheses have been tested for the current subsegment, the foregoing process is repeated for the next subsegment stored in RAM 400. If a subsegment falls on a frame boundary, and there is a phase flip at the boundary, the flip signal 440 is asserted, causing a change in sign of the complex phasor which will be multiplied by ensuing subsegments of samples. The result is that the phase reversals are accounted for such that the SI and SQ values derived from these subsequent subsegments will add constructively, rather than destructively, to the values accumulating in the correlation arrays stored in RAM 413.

The foregoing process is repeated for each of the subsegments within the portion of the current segment which is defined by the values in registers 441 and 442. When this process has been completed, correlation arrays of the form shown in FIG. 11 are present in RAM 413. These correlation arrays are provided to the GPS processor 303 over signal connection 313. GPS processor 303 uses these correlation arrays to detect the presence and range of satellites in the manner described previously.

In the second mode of operation, defined to be when the switch 433 is set to "0", the SI and SQ values for the current subsegment are combined noncoherently with corresponding values for previous subsegments in the current segment. Circuitry 410 forms the SS value from the current SI and SQ values. This SS value is then passed through switch 432a to complex adder 411, whereupon it becomes the real part of the first input to the complex adder 411. The imaginary part of this first input is the null value 434 which is passed through switch 432b. This value is then added to a corresponding value stored in cumulative correlation arrays maintained in RAM 413 in a procedure similar to that described earlier in relation to FIG. 12, except that only real values are maintained in the arrays rather than complex values.

Third and fourth modes of operation are also possible for the case in which bit circuitry 439 is not provided, and a phase reversal at a frame boundary cannot be detected, although the frame boundary itself can. In one implementation, the detection of the frame boundary is performed by comparator 437, which asserts an output signal when a frame boundary is encountered. In one implementation example, a frame boundary is a data epoch 324 (FIG. 9).

In the third mode of operation, the object is to perform a first coherent integration for the portion of the segment up to the frame boundary, and to perform a second coherent integration for the portion of the segment beyond the frame boundary, and then to noncoherently combine the two integrations. In one implementation, in which a segment has the same duration as a frame, there will be at most one frame boundary encountered as integration proceeds across the segment. In this implementation two sets of arrays of the form shown in FIG. 11 are maintained for the current segment. One set of arrays is complex, and is used to accumulate the coherent integration values in the manner described earlier in relation to the first mode of operation. The second set of arrays is real, and is used to noncoherently combine the coherent integrations performed on either side of the frame boundary.

When a frame boundary is encountered, the values in each of the entries in these arrays is put into noncoherent form by circuitry 431, that is, by computing the square root of the sum of the squares of the real and imaginary values stored in each entry. These values are then stored in the corresponding entries in the second set of arrays. The first sets of arrays are all then reset to zero. Coherent integration is then resumed, and the results thereof accumulated in the first set of arrays. When this has been completed, the values of the first set of arrays are put into noncoherent form in the manner described above. These values are then added to the corresponding values stored in the second set of arrays. The second set of arrays thus becomes the correlation values for the segment.

In the fourth mode of operation, the object is to perform coherent integration up to a frame boundary and to continue coherent integration beyond that point under two alternative hypotheses, one assuming that there has been phase reversal at the frame boundary and the other assuming there has been a phase reversal at the frame boundary.

In the one implementation, in which the segment duration is the same as the frame duration, there will be at most one frame boundary within a segment. In this implementation, two sets of arrays of the form shown in FIG. 11 are maintained in RAM 413 for the current segment. Both are complex. The first set of arrays is used to accumulate the results of coherently integrating up to the frame boundary in the manner described. When the frame boundary is detected, the accumulated results are copied into the second set of arrays. Coherent integration is then resumed for the remaining portion of the segment beyond the frame boundary. The first set of arrays is used to accumulate results under the hypothesis that there has been no phase reversal at the frame boundary. The second set of arrays is used to accumulate results under the hypothesis that there has been no phase reversal at the frame boundary. In one implementation, this is accomplished by flipping back and forth the sign of the complex phasor used by mixer 403 to correct for Doppler shift. A set of SI and SQ results are obtained for the current subsegment while leaving the sign of the complex phasor unchanged. These results are then coherently added to corresponding entries maintained in the first set of arrays. A second set of SI and SQ results are then obtained for the current subsegment while flipping the sign of the complex phasor. These results are then coherently added to corresponding entries maintained in the second set of arrays.

When this process has been completed for the current segment, peak correlator 430 is then employed to determine which of the two sets of arrays represents the greater degree of correlation with the segment. In one implementation example, the array is selected which has one or more correlation values significantly higher than any of the correlation values in the other array. The hypothesis corresponding to this array is then determined to be the correct one. The sign of the complex phasor is then set accordingly, and the arrays for that hypothesis are provided to GPS processor 303 (see FIG. 8) for satellite presence and range detection.

In an alternative implementation, the peak correlator 430 can be configured to find a plurality of the largest values and the locations of the two arrays. In this configuration, the processor is programmed to determine which of the values can be reliably used and which value to in fact use.

Figure 13A:
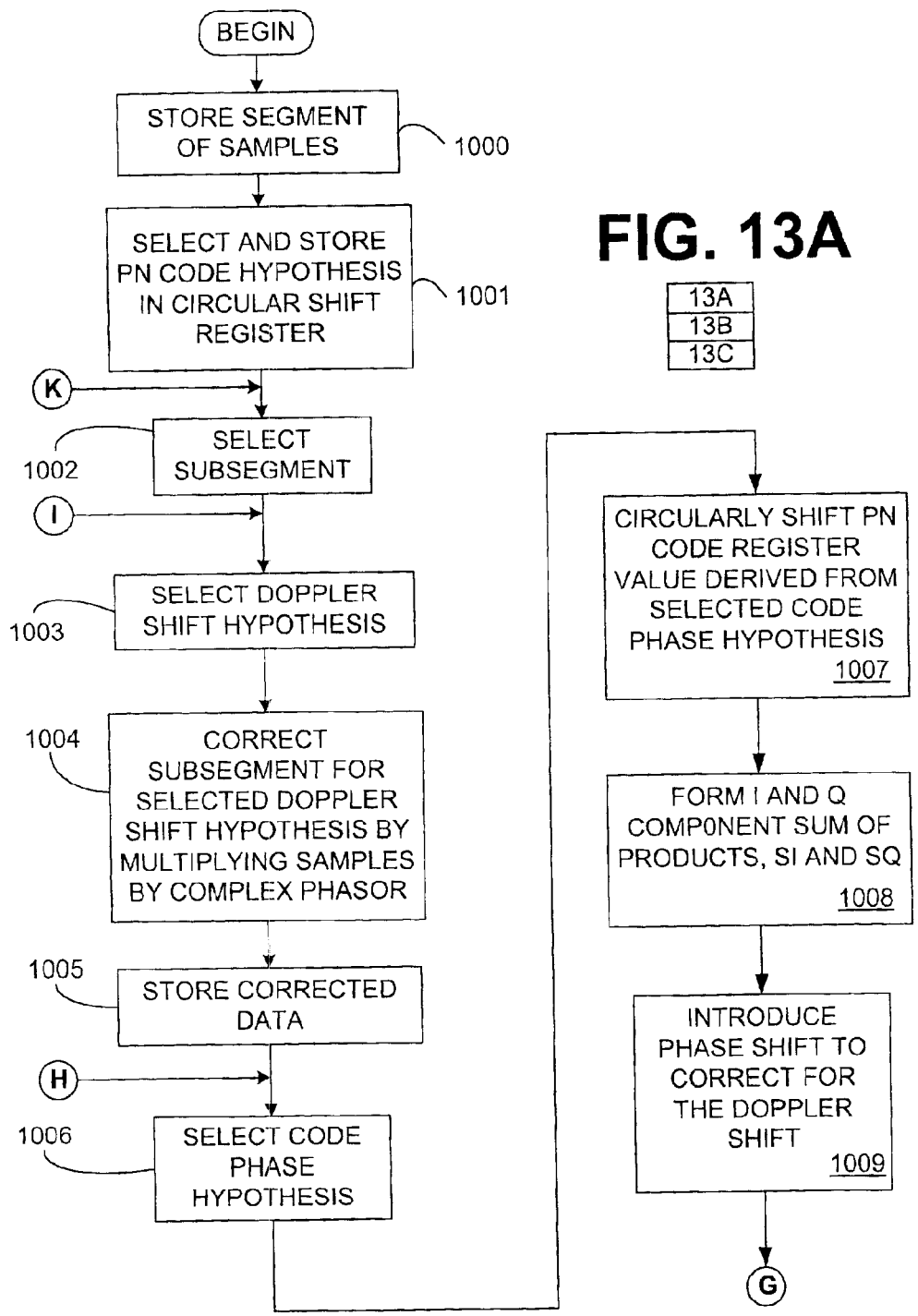
FIGS. 13A–13C illustrates three alternative embodiments of a method of operation of the matched filter of FIG. 9.
Figure 13B:
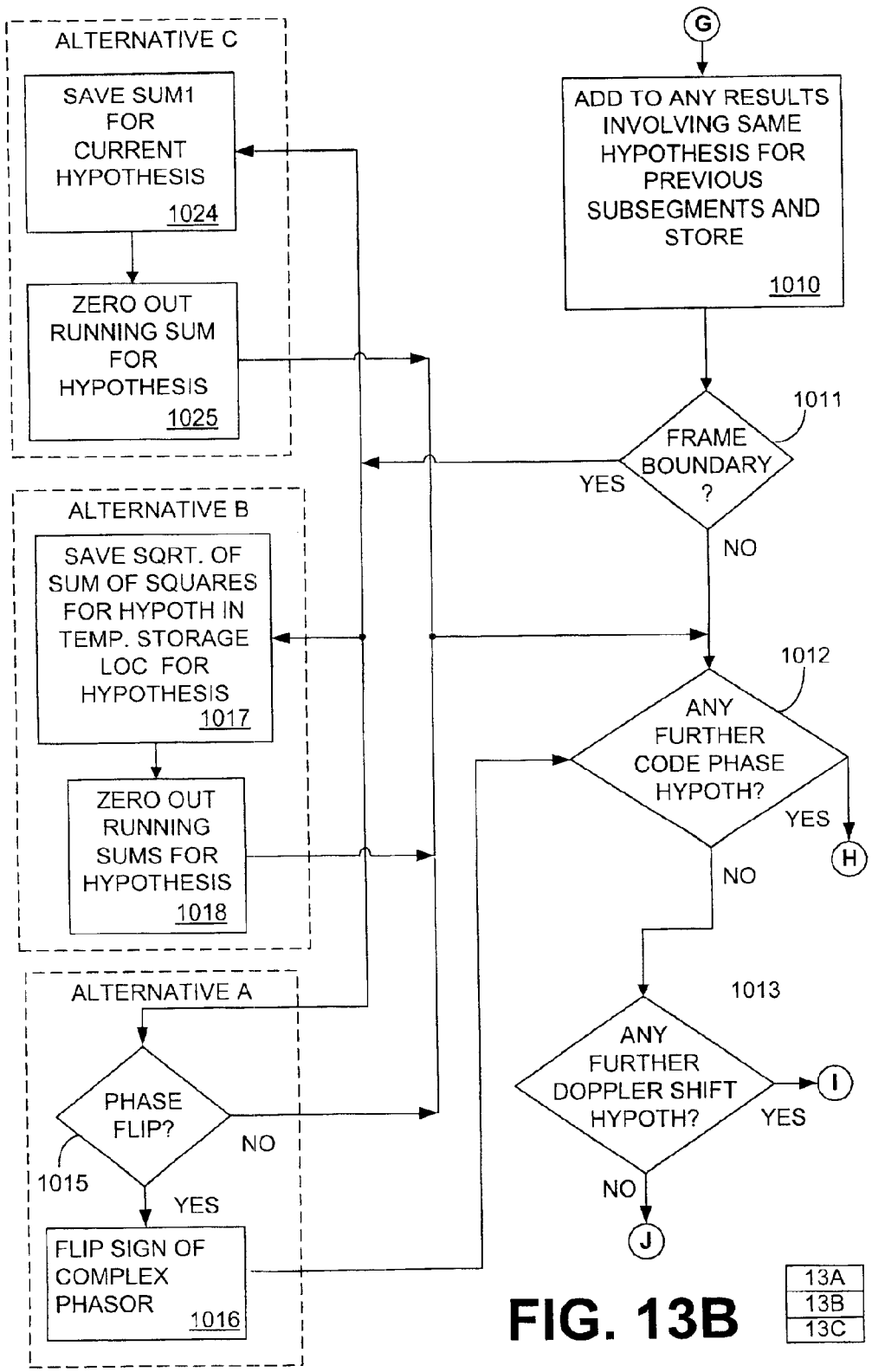
Figure 13C:
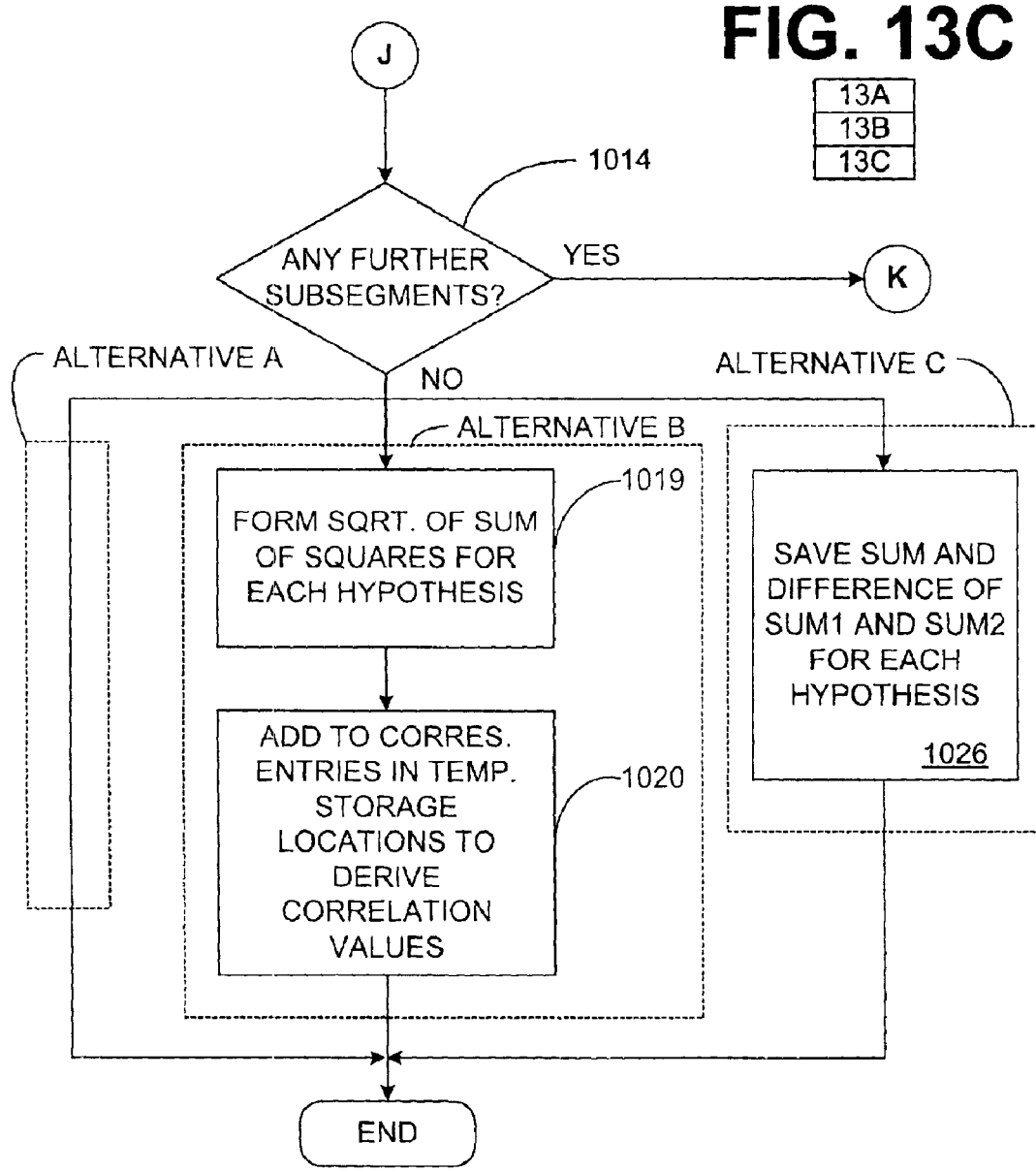

A method of operation of one embodiment of a signal detector 20 in FIG. 10, which includes the Doppler phase correction system 32 of the present invention, is illustrated in FIGS. 13A–13C. Three alternative modes of operation are illustrated: alternatives A, B, and C, each involving coherent integration. Alternative A corresponds to the first mode of operation discussed above in which phase reversals at frame boundaries can be detected, and coherent integration is performed across frame boundaries after account is taken of any phase reversal that may have taken place at the frame boundary.

Alternative B corresponds to the second mode of operation discussed above, in which frame boundaries, but not phase reversals, can be detected, first and second coherent integrations are performed on either side of the frame boundary, and then the results thereof noncoherently combined.

Alternative C corresponds to the third mode of operation discussed above, in which frame boundaries, but not phase reversals, can be detected, coherent integration is performed across a frame boundary under two alternative hypotheses, and then the hypothesis chosen which yield the best correlation results with the segment.

The method of FIG'S. 13A–13C will be explained in the following order: Alternative A, Alternative B, and Alternative C.

In FIG. 13A at step 1000, a segment of samples is stored. The samples are complex samples having real and imaginary components, or equivalently, magnitude and phase components. In one implementation, each sample has I and Q components. In the matched filter 402 of FIG. 10, the segment of samples is stored in RAM 400.

In step 1001, a PN code hypothesis is selected for testing and stored in a circular shift register. In the matched filter 402 (FIG. 10), the PN code hypothesis is stored in PN code register 408.

In step 1002, a subsegment of the segment of samples stored in step 1000 is selected.

In step 1003, a Doppler shift hypothesis is selected for testing. In the matched filter 402 (FIG. 10), this step is implicitly performed by incremental Doppler generator 401 which successively generates Doppler shift hypotheses responsive to constraints or bounds imposed by a user. In one implementation example, the Doppler shift hypotheses range from ±62,000 Hz. In another implementation example, the Doppler shift hypotheses range from ±4,500 Hz.

In step 1004, the subsegment selected in step 1002 is corrected for the Doppler shift hypothesis selected in step 1003. In the matched filter 402 (FIG. 10), this step is performed by complex mixer 403, which multiplies the subsegment of samples by a complex phasor. In one implementation example, this step is performed as described in U.S. Ser. No. 09/145,055, now U.S. Pat. No. 6,044,105, previously incorporated herein by reference.

In step 1005, the corrected data from step 1004 is stored, In the matched filter 402 (FIG. 10), the corrected data is stored in sample register 406.

In step 1006, a code phase hypothesis is selected for testing. In the matched filter 402 (FIG. 10), this step is implicit in the operation of PN code register 408 which successively and circularly shifts through each of the possible code phase hypotheses in a PN code repetition period, which, in one implementation, comprises 2046 half-chip increments.

In step 1007, the PN code hypothesis selected and stored in step 1001 is circularly shifted by an amount derived from the code phase hypothesis selected in step 1006. In the matched filter 402 (FIG. 10), the selected code phase hypothesis ranges from 0 to 2045 half-chip increments, and step 1007 is implemented by circularly shifting the PN code hypothesis by the number of half-chip increments comprising the selected code phase hypothesis.

In step 1008, the product of the shifted PN code from step 1007, and the corrected subsegment of samples from step 1004 is obtained. In one implementation, this step comprises forming the I and Q component sum of products (SOP), SI and SQ. In one, implementation example, SI and SQ are derived in accordance with equations (1) and (2), presented earlier. In the matched filter 402 (FIG. 10), this step is performed by sum of products circuitry 407.

Next, at step 1009, the Doppler phase correction system 32 of the present invention is used to introduce a phase shift into the correlation values produced in the proceeding step. This process will be more fully described in connection with FIGS. 14–16 later in this document. In essence, the phase shift minimized or eliminates the Doppler shift in the samples forwarded by the multiplier, such as the matched filter 402.

In step 1010, the phase shifted SI and SQ values are added to any corresponding values for the same hypotheses as applied to previous subsegments from the segment stored in step 1000. In one implementation, cumulative correlation arrays of the form shown in FIG. 11 are maintained for the segment, and the SI and SQ values determined in step 1008 are added to corresponding values maintained in these arrays in accordance with the procedure illustrated in FIG. 12. In the matched filter 402 (FIG. 10), this step is performed by complex adder 411, and the cumulative arrays for the segment are maintained in complex RAM 413.

In step 1011, a determination is made whether a frame boundary has been encountered. If so, for Alternative A, step 1015 is performed. In step 1015, a determination is made whether there is a phase reversal at the frame boundary. If so, step 1016 is performed. If not, a jump is made to step 1012. In step 1016, the sign of the complex phasor employed in step 1004 for Doppler correction is flipped. Step 1012 is then performed.

In step 1012, a determination is made whether there are any further code phase hypotheses which are to be tested for the selected PN code and Doppler shift hypotheses. If so, a jump is made to step 1006 and the process beginning at this point repeated for the new code phase hypothesis. If not, step 1013 is performed. In the matched filter 402 (FIG. 10), this step is implicit in the operation of PN code register 408, which successively shifts through the 2046 code phase hypotheses to be tested for a given PN code and Doppler shift hypothesis.

In step 1013, a determination is made whether there are any further Doppler shift hypotheses which are to be tested for the selected PN code hypothesis. If so, a jump is made to step 1003, and the process beginning at this point repeated for the new Doppler shift hypothesis. If not, step 1014 is performed. In the matched filter 402 (FIG. 10), this step is implicit in the operation of incremental Doppler generator 401, which cycles through a plurality of Doppler shift hypotheses for a given PN code hypothesis. In one implementation example, the Doppler shift hypotheses tested for a given PN code hypothesis range from ±62,000 Hz.

In step 1014, a determination is made whether there are any further subsegments to be analyzed for the segment which was stored in step 1000. If so, a jump is made to step 1002, and the process beginning at this point repeats itself using the new subsegment. If not, for Alternative A, the process terminates. At this point, a plurality of complex correlation values are available for further analysis, one complex value corresponding to each of the combinations of PN code, Doppler shift, and code phase hypotheses tested. In the matched filter 402 (FIG. 10), these values are stored in RAM 413, and are available to GPS processor 303 (FIG. 8)over bus 313. In one implementation example, these values are in the form of arrays as illustrated in FIG. 11.

In one functionally-equivalent variant of the foregoing, the order of blocks 1002 and 1003 is reversed, as well as that of blocks 1012 and 1013. A benefit of this approach—processing all the subsegments first before changing the Doppler hypothesis—is that it permits a smaller RAM 400 to be used. Under the opposite ordering—in which all the Doppler hypotheses for a given subsegment are processed first—the RAM size would need to be expanded by a factor equal to the number of Doppler hypotheses.

Alternative B will now be described. Steps 1000–1010 are identical to those described earlier in relation to Alternative A, and the explanation thereof need not be repeated. In step 101, when a frame boundary is detected, instead of branching to step 1015, for Alternative B, step 1017 is performed.

In step 1017, a second set of arrays is created for the segment of interest, with entries for each of the combinations of PN code, Doppler shift, and code phase hypotheses tested. In one implementation, the second set of arrays is real rather than complex. The magnitude of each complex entry in the first set of arrays is computed by taking the square root of the sum of squares of the real and imaginary components, and the resulting value is stored in the corresponding entry in the second set of arrays. In the matched filter 402 (FIG. 10), this step is performed by circuitry 431. This procedure is repeated for each of the entries in the first set of arrays.

Step 1018 is then performed. In step 1018, each entry in the first set of arrays is zeroed out. The process then proceeds beginning with step 1012. Steps 1012–1013 are then performed in an identical manner to the like-numbered steps explained earlier in relation to Alternative A, and the explanation thereof need not be repeated here. In step 1014, if it is determined that further subsegments remain for consideration, a jump is made to step 1002, and the process repeats itself at this point. If there are no remaining subframes to be considered, steps 1019 and 1020 are performed. In step 1019, the magnitude of each of the complex values comprising the first set of arrays is computed in the manner previously described, and in step 1020, the magnitude of a value is added to the corresponding value stored in the second set of arrays. In the matched filter 402 (FIG. 10), this step is performed by circuitry 431 in combination with complex adder 411. This procedure is repeated for each of the values in the first set of arrays. At this point, the second set of arrays comprises the correlation values for the segment. In one implementation, the second set of arrays is stored in RAM 413, and is accessible by GPS processor 303.

Alternative C will now be described. Steps 1000–1010 are identical to those described earlier in relation to Alternative A, and the explanation thereof need not be repeated. In step 1011, when a frame boundary is detected, instead of branching to step 1015, for Alternative C, step 1024 is performed. In step 1024, a second set of arrays is created for the segment of interest, with entries for each of the combinations of PN code, Doppler shift, and code phase hypotheses tested. In one implementation, the second set of arrays is complex. The value of each complex entry in the first set of arrays is stored in the corresponding entry in the second set of arrays. This procedure is repeated for each of the entries in the first set of arrays.

Step 1025 is then performed. In step 1025, each entry in the first set of arrays is zeroed out. The process then proceeds beginning with step 1012. Steps 1012–1013 are then performed in an identical manner to the like-numbered steps explained earlier in relation to Alternative A, and the explanation thereof need not be repeated here. In step 1014, if it is determined that further subsegments remain for consideration, a jump is made to step 1002, and the process repeats itself at this point. If there are no remaining subframes to be considered, step 1026 is performed. In step 1026, the complex values comprising the first set of arrays are added to and subtracted from to the corresponding values stored in the second set of arrays. In the matched filter 402 (FIG. 10), complex adder 411 performs this step. The sums are stored in the first set of arrays. The differences are stored in the second set of arrays. This procedure is repeated for each of the values in the first set of arrays. At this point, the first and second sets of arrays comprise the correlation values for the segment. The first set of arrays holds the hypotheses corresponding to no phase inversion at the frame boundary. The second set of arrays holds the hypotheses corresponding to a phase inversion at the frame boundary. In one implementation, the first and second sets of arrays are stored in RAM 413, and are accessible by GPS processor 303.

Note that the foregoing description of the methods for Alternatives B and C needs to be expanded for the case in which there is more than one frame boundary in a particular segment. In that event, in the case of Alternative B, upon encountering the subsequent frame boundaries, in step 1017, the magnitude values created for the first set of arrays are added to corresponding values in the second set of arrays rather than being used to initialize those values. In the case of Alternative C, instead of just two data inversion hypotheses to be tested, there will be an exponential number to be tested equal to $2^n$; where n is the number of frame boundaries encountered in a segment. Forming and comparing all $2^n$ possible sum and difference combinations from the n partial sums $S_k$ to find the maximum value performs these $2^n$ tests. Accordingly, in step 1025, the first set of arrays needs to be replicated n times such that each partial sum ending at a frame boundary has a corresponding set of arrays maintained to store the values. In step 1026, one of the $2^n$ sequences of data inversions corresponding to these arrays is then selected as the correct one. It is not necessary to compute and store all $2^n$ combinations. Instead, two additional sets of arrays are provided. One set holds the current sum/difference combination being computed. The second holds the sum/difference combination having the largest magnitude element among all the combinations previously compared. The maximum peak detector 430 (FIG. 10) can be used to compare values and the circuitry of 431 (FIG. 10) can be used to determine magnitudes of complex numbers. When all $2^n$ combinations have been examined, one set of arrays holds the maximum magnitude found, along with the corresponding sequence of data inversions, the PN code, the Doppler value and code phase hypothesis corresponding to the maximum magnitude value. This data can be stored in RAM 413 (FIG. 10).

A related issue is integrations performed across multiple segments. In this event, there will be a number of intervening frame boundaries (and data bits) to account for, as well as the complex phase change due to the Doppler hypothesis. As the total time span of the multiple segments increases, the spacing of the Doppler hypotheses in frequency must decrease. The net result is that each output for a given hypothesis of a given segment has to be weighted by the accumulated data phase flips times the accumulated Doppler phase $e^{jw_dT}$, where T is the time of a segment relative to the first segment.

3. Implementation Example

A matched filter chip code-named "Magna" which combines some of the functionality of the sampling circuitry 308, the timing circuitry 307, and the signal detector 20 (including matched filter 402; see FIG. 10) has been developed by the assignee of the subject application (Conexant Systems, Inc. of Newport Beach, Calif., U.S.A.). A processor chip which embodies the functionality of the GPS processor 303 of FIG. 4 code-named "Scorpio", Part No. 11577-11, is commercially available from the assignee of the subject application. In one implementation, the processor has additional GPS-specific circuits, such as tracking channels for continuously tracking a number of GPS satellite signals. Typically, the processor includes at least an embedded microprocessor with an external bus. In one configuration, the processor views the matched filter chip as a memory mapped peripheral. It issues commands to the matched filter chip, and retrieves results after it has completed processing for a given set of commands. An RF receiver chip which embodies the functionality of the GPS radio receiver 300 (FIG. 4) code-named "Gemini/Pices Monopack", Part No. R6732-13, is commercially available from the assignee of the subject application. Additional details regarding this implementation example are available in pending U.S. application having Ser. No. 09/145,055, previously incorporated herein by reference.

In order to perform coherent integration over intervals greater than 20 ms, two things are required. First, one needs to know where the 50 Hz data bit edges, or data epochs 324 (DE; see FIG. 9), occur. Second, the Doppler shift needs to be known to accuracy such that, over the coherent integration period, the phase angle of the desired signal does not change significantly.

The location of the data epochs 324 (FIG. 9) can be known if the GPS time is known to an accuracy of less than 1 millisecond. This is possible because the GPS time is a time of week value and the 50 Hz data is aligned with week boundaries. If the GPS time is taken modulo 20 ms, the resulting value is the time within the current 20 ms long bit. Precise GPS time can be determined from a prior solution of the GPS navigation equations, or from an outside source, such as a mobile phone system having a timing relationship to GPS time. It is also the case that each 1 ms period of the PN code, or code epoch 323 (FIG. 9; CE), has a precise timing relationship to the data bits. Every $20^{th}$ CE is also a DE. Using this relationship, it is feasible to account for the location of the DE. This information is sufficient to allow coherent integration over 20 ms intervals. If, in addition, the value of the data bit is known, the integration can be extended for longer periods, limited only by Doppler and receiver movement.

Both Doppler uncertainty and receiver motion further limit the duration over which coherent integration is effective. At a resolution of about 62 Hz, the Doppler for a given operation of the matched filter 402 (FIG. 10) cannot be more accurate than ±31 Hz. For an error of 31 Hz, the Doppler will cause a sign reversal in the real and imaginary components of the signal after $\frac{1}{31}$=32 milliseconds. To perform Doppler hypothesis testing over longer periods than this with coherent integration requires a greater Doppler resolution than 62 Hz.

If it is required to coherently integrate over several 20 ms intervals, the Doppler generator design should provide a Doppler resolution finer than 62 Hz. In general, if T is the coherent integration time in terms of actual elapsed time from the start of the first data capture to the start of the final data capture, the required Doppler resolution is 1/(2T). Thus, for a one second integration time, the required Doppler resolution is 0.5 Hz or better.

In addition to Doppler, the motion of the receiver must be considered. The wavelength of the GPS signal at L1=1575.42 MHz is about 19 cm or 7.5 inches. If the receiver is in a hand held device, motion of half this distance will cause a phase inversion resulting in signal cancellation when using coherent integration. A person walking along at 4 mph will travel 3.75 inches in 53 milliseconds. Thus, a practical limit for even a slowly moving receiver may be only a few 20 ms periods. Nevertheless, if the values of the data bits are available, it is still beneficial to operate over several 20 ms periods with coherent integration in order to more rapidly improve SNR.

FIG. 10 illustrates an embodiment of Magna for processing coherent integrations. A first aspect is the output of the correlation adder tree, that is, circuitry 407. Instead of processing the 1 ms coherent integrations to compute the magnitude, the complex values are directly summed into the correlation array RAM storage 413. The size of the RAM accommodates the real and imaginary values rather than only the magnitude. Since non-coherent integration may still be required in some applications, this aspect is effected with a switch. In coherent mode, the magnitude calculation is bypassed.

A second aspect is the implementation of a register 438 to hold the value of the code epoch 323 (FIG. 9; CE) or subsegment at which the DE occurs. This value is provided by the external processor from its knowledge of GPS time. When the DE is encountered, the Incremental Doppler generator 401 receives the flip signal 440, which causes the complex phasor to flip its sign, thus preserving the coherent integration across the data bit boundary. The flip signal 440 is controlled by the bit value 439. If the bit value does not cause a sign change, the flip signal-state does not change at the DE. The external processor provides the value of the bit. Note that each satellite will have a different DE and Bit register value, set by the processor before the matched filter algorithm is run for that satellite.

C. Doppler Phase Correction System

Figure 14:
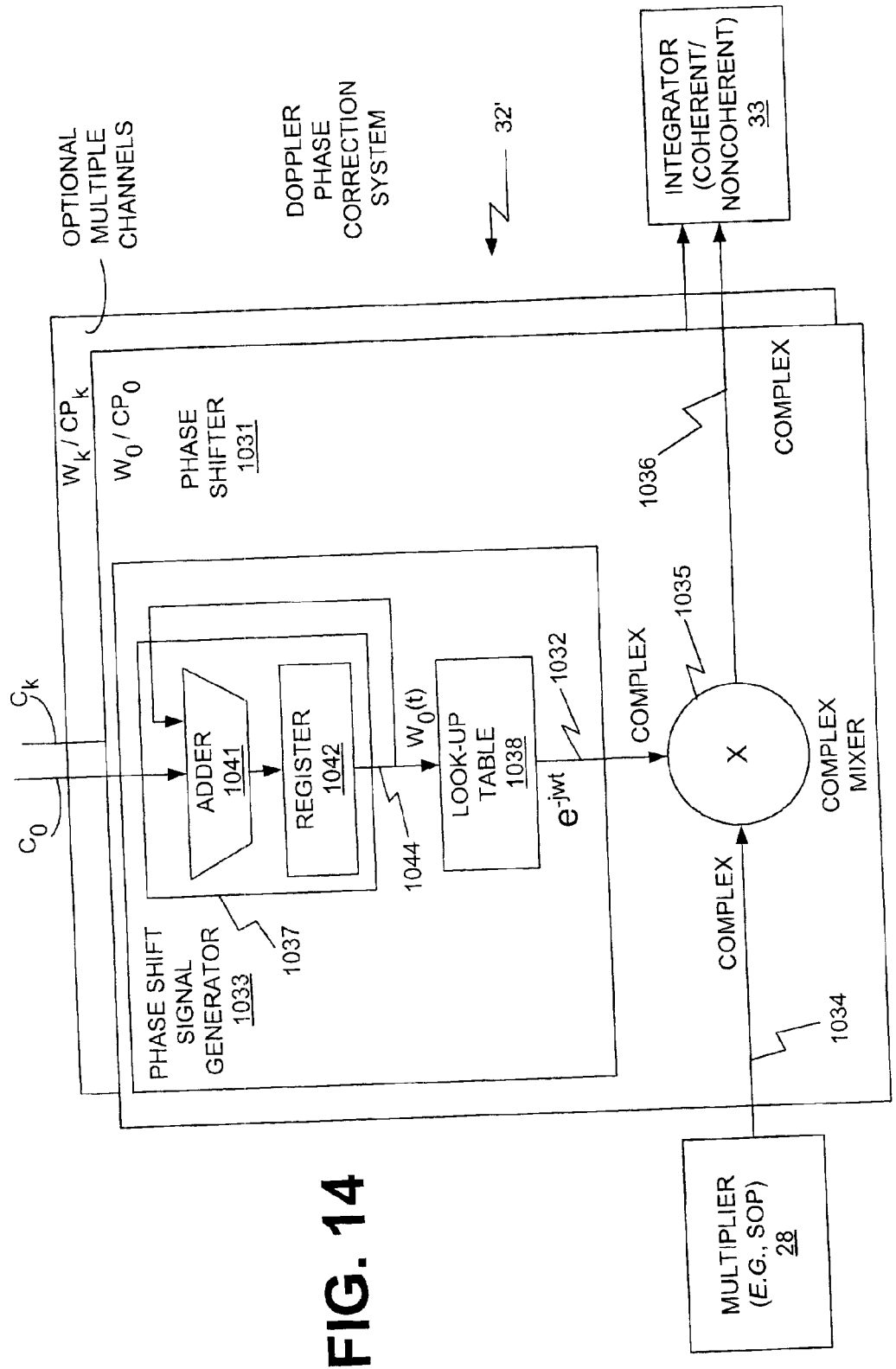
FIG. 14 is an embodiment of the Doppler phase correction system in accordance with the present invention.
Figure 15:
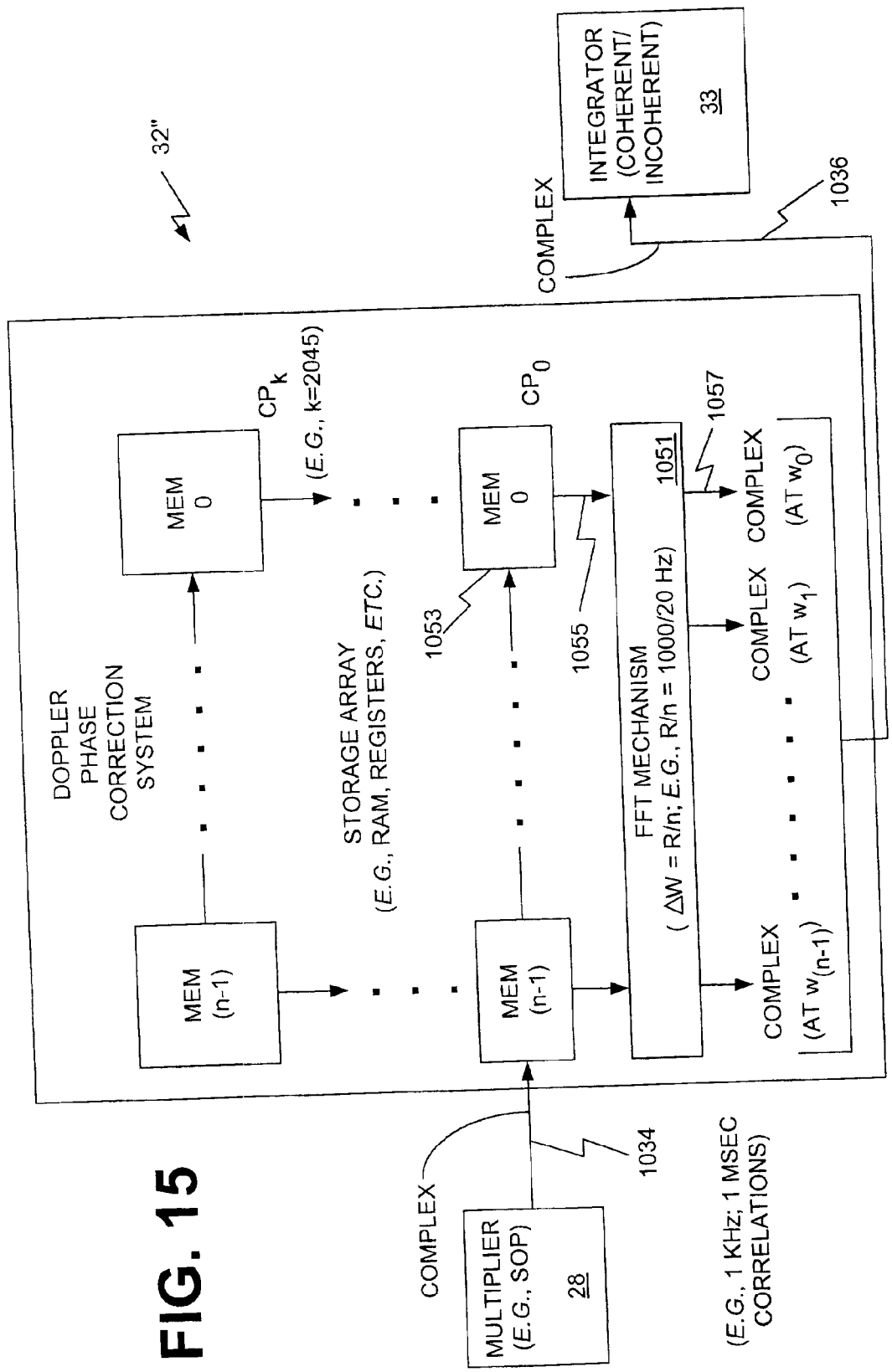
FIG. 15 is a further embodiment of the Doppler phase correction system in accordance with the present invention.

FIG. 14 and FIG. 15 show first and embodiments (intended to be nonlimiting examples), respectively, of the Doppler phase correction system 32 (FIG. 10) and associated methods. Generally, the Doppler phase correction system 32 enhances the correlation process by assisting in eliminating adverse Doppler phase shift in the correlation values, i.e., multiplication results (in the preferred embodiment, based upon 1 ms correlations corresponding to a code repetition period, or 2046 ½ chips), that are output from a multiplier 28, for example but not limited to, the SOP 407 (FIG. 10) associated with the matched filter 402 (FIG. 10). In essence, from correlation value to correlation value that are output from the multiplier 28, the phase angle θ of each complex correlation value will slowly rotate due to undesirable Doppler phase shift imposed upon the carrier signal. Moreover, if the rotation of each value is slow enough that the frequency has not been aliased and if the value can be sampled quickly enough, then each correlation value can be processed with another phase shift to hopefully correct for the inherent adverse Doppler shift. Then, the correlation values can be coherently and/or noncoherently integrated via the integrator 33, resulting in an overall faster correlation process (the former integration being faster than the latter) to determine the correct code phase.

One embodiment of the Doppler phase correction system 32 is shown in FIG. 14 and is generally denoted by reference numeral 32'. In this embodiment, in terms of architecture, the Doppler phase correction system 32' includes M (one or more) phase shifters 1031, denoted by a number k, that are each designed to impose a set of incremental phase shifts $\theta_k^m = w_m \Delta T k = 2\pi f_m \Delta T k$, as appropriate, upon the complex correlation values $c_i^k$ 1034 received from the multiplier 28 (see also FIGS. 2, 4 or 6) at a particular sampling frequency $F_s = 1/\Delta T$. During each processing period k, each of the m phase shifters 1031 is configured to receive a complex correlation value $c_i^k$ 1034 from the multiplier 28 pertaining to one (or more) of the respective code phase (CP) produced during each of the K processing periods.

When only one (M=1) of the phase shifters 1031 is implemented, then the Doppler phase correction system 32' essentially samples and produces a plurality i of new correlation values 1036 using a single Doppler correction frequency $w_m$ for the particular CP values $c_i^k$ during each of the K processing periods. The I $c_i^k$ are received from multiplier 2002 one at a time during each processing period, processed by phase shifter 1031 and delivered to integrator 2003, where they are each combined with corresponding values from prior processing intervals.

When more than one phase shifter 1031 (one corresponds to each CP) is used, then the system 32' essentially samples and produces a larger plurality (an array) of new correlation values 1036 using a plurality of different frequencies $w_0 \ldots w_{M-1}$, one for each CP (and phase shifter 1031). Note that the number of correlation values 1034 generated by the multiplier 28 (see also FIGS. 2, 4 or 6) may not correspond to the number k of correlation values 1034 that are forwarded to the k phase shifters 1031, as the system may be configured so that only a predefined subset of the correlation values 1034 (pertaining to a predefined subset of CPs) are operated upon by the system 32'. In this configuration, each segment corresponding to each code phase (CP) is operated upon by each one of the M phase shifters 1031. The latter configuration results in the production of more correlation values (a plurality of CP correlations; one CP correlation at each of the frequencies $w_0 \ldots w_{M-1}$) for analysis and perhaps a better match to the actual Doppler shift imposed upon the input samples. The foregoing scalability feature also applies to the embodiment, which will be described later.

Note that as the number of CPs (as well as phase shifters 1031) to be analyzed is increased, then the embodiment shown in FIG. 15 that employs a FFT process becomes more desirable as an implementation option based upon speed, complexity, and hardware, because an FFT process can handle a larger number of CPs better than the embodiment in FIG. 14. On the other hand, as the number of CPs to be processed and the number of phase shifters become smaller, then the embodiment of FIG. 14 becomes more desirable.

The process employed by the Doppler phase correction system 32' can be described mathematically as follows. Let $c_i^k$ be the $i^{th}$ code phase for the $k^{th}$ of K sub-segment (i.e., $k^{th}$ 1 ms segment for code phase i). From the SOP 407 (FIG. 10), up to 2046 code phases can be obtained, so $0 \leq i < 2046$. From RAM 400, as many as 20 subsegments of 1 ms may exist, so $0 \leq k < 20$. The number of phase shifter 1031 blocks is M. The value of M is determined by the total length of coherent integration time, $T_{coh}$. In order for coherent detection to succeed, the accumulated Doppler error over $T_{coh}$ must be a less than a Doppler cycle, say, for example, ¼ cycle. This requires that the Doppler correction frequencies, $f_m$, be spaced no more than $\Delta f_m = ¼ T_{coh}$ Hz apart. For example, if $T_{coh} = 20$ ms, $\Delta f_m = 12.5$ Hz.

For each phase shifter 1031 (FIGS. 14 and 15), there is a complex exponential weight $e^{j\omega_m \Delta Tk}$, where $\omega_m$ is the radian Doppler correction rate for the $m^{th}$ shifter, $\Delta T$ is the sample interval (1 ms) and k is the subsegment index. For each of the code phase outputs that are used, each phase shifter 1031 produces:

$$CP_i^k e^{j\omega_m \Delta Tk}$$

so that each phase shifter 1031 produces up to 2046 shifted code phase values. These values are independently summed over up to 20 subsegments each. This produces sums as follows:

$$SumCP_i^m = \sum_{k=0}^{K-1} CP_i^k e^{j\omega_m \Delta Tk}$$

for code phase I and shifter m over K sub-segments. Note that the Doppler Phase Correction System 32 has expanded the number of outputs from SOP 407 being integrated and stored in RAM Storage 413 by a factor of M.

If each phase shifter 1031 processes all 2046 code phases (I=2046), each one produces 2046 shifted code phases, each shifted by the Doppler correction of that shifter 1031. These outputs are all independently integrated over up to 20 subsegments of 1 ms each. If the shifter Doppler correction frequencies are selected to be the same ones produced by the FFT in the embodiment so that M=20, 20 shifters will produce the same 20*2046 correlation values as the FFT.

With reference to FIG. 14, in architecture, each phase shifter 1031 is allocated to a respective sampling frequency $(w_0 \ldots w_{M-1})$ and includes a phase shift signal generator 1033 designed to produce a complex phase shift value $e^{jwt}(t)$ and a mixer 1035, for example, a multiplier, designed to combine the generated complex phase shift value $e^{-jwt}(t) = e^{-j\theta}(i)$ with a correlation value $c_i^k$ 1034 communicated to the Doppler phase correction system 32' from the multiplier 28 in order to produce a phase shifted value $c_i^k e^{-j\theta}$, denoted by reference numeral 1036. In the preferred embodiment, each of the values 1032, 1034, and 1035 are complex values having 16 bits of real and 16 bits of imaginary. The complex phase shift value $e^{-jwt} = e^{-j\theta}(i)$ is incremented in each phase shifter 1031 after processing the I correlation values of each processing interval, so that the Doppler phase shift, which accumulates over time, is minimized or preferably eliminated, assuming that the Doppler correction frequency w associated with the particular phase shifter 1031 corresponds, at least to some extent, to the Doppler shift frequency.

Each phase shift signal generator 1033 includes a phase accumulator 1037 connected to a look-up table 1038. The phase accumulator 1037 produces and provides an integer that is representative of a phase w(t) to the look-up table 1038, which uses the integer input as an index to identify a complex value 1032 $(I-jQ=\cos(wt)-j\sin(wt)=e^{-jwt})$, which is ultimately combined with correlation values 1034 from the multiplier 28 via the mixer 1035. The complex value 1032 represents a unity magnitude sinusoid with the same arbitrary phase angle as the value 1044. The integer input representing the phase shift θ is incrementally increased over time via the phase shift signal generator 1033.

As a nonlimiting example, the complex value 1032 in the preferred embodiment is represented by the combination of 16 bits of a real number component and 16 bits of an imaginary number component, which are collectively indicative of a magnitude and phase, as is well known in the art. It is likely that some implementations would use fewer bits, consistent with the tolerable tradeoff of implementation loss versus circuit size/power/cost. The minimum would be one bit quantization of the sin and cos values, corresponding to +/−1 square waves to approximate the sinusoids.

Note that the flip signal 440 (FIG. 10) has already normalized the input data so that phase reversals of the input data (resulting from phase transitions between data epochs 324; see FIG. 9) has already been accounted for. Accordingly, the polarity of the complex value 1032 need not be periodically changed, and the I and Q values can be combined in coherent integrator 30 constructively, rather than destructively.

The phase shift signal generator 1033 includes an adder 1041 connected to a register 1042, which together increment, temporarily store, and provide the integer values representative of w(t) to the look-up table 1038. The adder 1041 receives a constant C, for example, $C_0$ in the case of the adder 1041 corresponding to $w_0$, that is defined based upon the inherent Doppler shift to be corrected and the size of the register 1042. After the adder 1041 increments the register 1042, the register 1042 provides the value w(t), denoted by reference numeral 1044, to the input to the adder 1041, where it is combined with a constant $C_0$ to produce w(t+1) for the next look up process. The constant may be hardwired, predefined in memory, or dynamically selectable or definable via a suitable controller.

More specifically, assuming that the look-up table 1038 holds one cycle of complex exponential, then the bits from the register 1042 which address this look-up table 1038 will produce one period of Doppler every time the address bits start at zero, increment up with the repeated addition of the constant C, and then finally roll back to zero. Usually, this look-up table 1038 represents a quantization of the complex exponential in both phase angle and amplitude. For example, if just the three of the most significant bits (MSBs) of register 1042 are used to address the look-up table 1038, then there are only 8 addresses per cycle of Doppler. This means that each address represents 360/8=45 degrees. As long as the three MSBs are constant, the output 1032 of the table 1038 is constant. The value of data (sinusoid amplitude for sine or cosine) being output for a given address is independent of the size of the address space. With a three-bit address space, a data width of as many bits as desired can be implemented. Presumably, the same number of bits to represent sine as cosine is utilized. If two bits are used for each, then the sine and cosine values will be three level, −1, 0 and +1. If 16 bits are used, then more values can be represented, which would be advantageous (since at the 45 degree point, for example, the value 0.707 of doppler offset may be needed). In conclusion, there are many ways to implement the foregoing functionality, but they all basically quantize phase and amplitude.

In an alternative embodiment, the register value residing within the register 1042 is not utilized to address the look-up table 1038 directly. Instead, the rollover may cause a state machine (not shown; e.g., a counter) to increment, and the counter value associated with the state machine may address the look-up table 1038 or otherwise provide the complex value 1032. An example of this method is described and illustrated in U.S. Pat. No. 6,044,105 (e.g. see FIGS. 4*a* and 4*b* therein), which is hereby incorporated by reference in its entirety.

Although not limited to these parameters, in the preferred embodiment, the correlation values 1034 that are operated upon by the Doppler phase correction system 32' correspond to 1 ms time periods (code repetition period) of the carrier signal and a code phase of 2046½ chips. If the sampling period were made shorter, then the Doppler phase correction system 32' could cover a larger frequency range (additional values of ω), to thereby create more phase shifted values for later correlation and integration analysis, resulting in better matching to the Doppler shift. For example, if the subsegment time is shorted to ½ ms, sampling occurs at 2000 Hz rather than 1000 Hz. Note that 2046 code phase correlations are still obtained out of the SOP 407 (FIG. 10) each half ms. Functionally, this can be accomplished by loading ½ ms of samples from the input RAM 400 (FIG. 10) and filling the rest of the sample register 406 with zeros. In this case, 40 segments of ½ ms will be obtained, each producing 2046 code phases.

A nonlimiting example of operation is now described. In this example, the following assumptions are made for purposes of description: i=20 (corresponding to the 20 subsegment processing intervals of the 1 ms samples from the multiplier 28) and k=100 (corresponding to the number of CPs that will be used and analyzed from the multiplier 28). The value of i may be any number up to 2046, but is preferably a small subset of 2046, otherwise the embodiment of FIG. 15–17 would likely be a better implementation option). Assume M=20, so that the ±500 Hz Doppler error range can be sampled every 50 Hz.

In this example, there will be a total of M*i, or 20*100 independent integrations ultimately being carried out by the integrator 30 over some multiple of 20 ms periods. Every 20 ms, the multiplier 28 of FIG. 14 (also refer to, for example but not limited to, SOP 407 in FIG. 10) generates 20*2046 of 1 ms correlation values 1034 (essentially coherent integrations) and communicates only a subset, or in this example 20*100 to the phase shifters 1031, 20 for each of the 100 phase shifters 1031. Then, each phase shifter 1031 produces 20*100 outputs 1036 over the 20 ms period. The total number of outputs of all 40 phase shifters is 20*20*100 shifted 1 ms integrations. Each of the 20*20*100 outputs 1036 is integrated over the 20 of the 1 ms outputs having the same input code phase and output shift value into one of 20*100 locations of a suitable storage mechanism (e.g., RAM 413 in FIG. 10) separately. Thus, there are 20*100 values stored after the first 20 ms. The net result is that the 100 correlation values integrated over 20 ms into RAM storage 413 from SOP 407 at a single Doppler correction frequency implemented in Incremental Doppler Generator 401 have been expanded to 20 sets of 100 correlation values at 20 different Doppler error frequencies. The performance improvement includes the fact that these 20 sets of correlations each has the same performance degradation due to Doppler over a ±500 Hz total frequency range of Doppler error that the single original set would have had over only a ±25 Hz range.

If desired, the aforementioned summing operation can be repeated by the integrator 30 or other suitable processing mechanism (e.g., a microprocessor) for some number of 20 ms periods. Most likely, this summing operation is noncoherent (magnitudes are added, or accumulated, as opposed to coherent, where real and imaginary components are added, or accumulated, separately). Noncoherent integration is preferred because in the preferred embodiment only Doppler correction that is valid over a time period determined by the sample interval at the phase shifter input, the number of phase shifters and the phase shifter frequency spacing has been performed. If it were desirable to perform coherent integration for a longer time period, then coherence in the outputs 1034 from the multiplier 28 would need to be maintained for longer than a 20 ms period.

FIG. 15 is a block diagram showing the embodiment of the Doppler phase correction system 32 (FIG. 10) and is generally denoted by reference numeral 32". In this embodiment, a Fast Fourier transform (FFT) mechanism 1051 is utilized to impose a phase shift upon each of the correlation values 1034 from the multiplier 28. The correlation values 1034 corresponding to each code phase are processed separately by the FFT mechanism 1051. As an example, although not limited to these parameters, the input values 1034 and the output values 1057 represent complex numbers, each having 16 bits of real and 16 bits of imaginary, and the input values 1034 are communicated to the system 32" at 1 kHz (based upon 1 ms samples of the carrier signal). It is likely that some implementations would use fewer bits for the values 1034 and 1057, consistent with the tolerable tradeoff of implementation loss versus circuit size/power/cost. The minimum would be one bit quantization of the sin and cos values, used internally to the FFT, corresponding to +/−1 square waves to approximate the sinusoids. Generally, there are several areas where quantization can be practiced in this embodiment. The input data samples (1 ms integrations), the trigonometric factors in the FFT, and/or the intermediate results could each be quantized.

As shown in FIG. 15, each correlation value 1034 corresponding to each code phase of a code is communicated to and stored in a respective one of the memory elements 1053 (MEM 0 . . . MEM n, where n is the number of iterations of multiplicative correlation using the same CP in the multiplier 28). The memory elements 1053 may be implemented in RAM, registers, or any other suitable temporary storage mechanism. RAM is likely preferred in many applications, as it will reduce power consumption and hardware requirements.

For example, if each of the correlation values 1034 is based upon an analysis of 1 ms of carrier signal, then each correlation value corresponding to 1 ms of carrier signal is placed in a respective memory element 1053. Each row of memory elements 1053 corresponds to a code phase $CP_o$ . . . $CP_k$, where k is any number, but is 2045 in the preferred embodiment, which corresponds to 2046 code phase values, spaced at ½ chip intervals over the 1023 chips or 1 ms period of a PN code.

After a row is loaded with a set of correlation values 1034, then the row of correlation values is passed through the FFT mechanism 1051, as indicated by arrows 1055, in order to produce phase shifted and coherently integrated complex values 1057, pertaining to a particular CP. The CP has been frequency shifted in the FFT an attempt to compensate for the Doppler frequency error and then coherently integrated over the n compensated samples. The FFT efficiently performs this frequency shift and integrate operation at each of n frequencies defined by the input sample rate (for example 1 ms) and the number of FFT points, n. Moreover, the n 20 ms coherent integration values 1057 are communicated to the integrator 30, where the values are store and can be further coherently or noncoherently integrated. Each of the plurality of output values 1057 corresponds to a different frequency shift $w_0$ . . . $w_{n-1}$, where n is any number but is 20 in the preferred embodiment. One of these will exhibit the best match to the adverse Doppler phase shift, and hence, will exhibit the highest correlation value.

The FFT mechanism 1051 is created from any suitable form of logic, in hardware and/or software, for example but not limited to, in combinational logic in the form of an application specific integrated circuit (ASIC). Further, in the preferred embodiment, although not limited to these parameters, the range R in sampling frequencies w of the FFT mechanism 1051 is 1000 Hz (plus or minus 500 Hz based upon the input samples that correspond to 1 ms of carrier signal) and the frequency shift Δw between adjacent outputs 1057 is 50 hertz (1000/20=50; defined to produce a phase shift for each 1 ms sample of the 20 ms set pertaining to each code phase). To use the normal FFT parameters/ nomenclature, Δt=0.001 sec, T=0.02 sec, Δf=1/T=50 Hz and F=1/Δt=1000 Hz. The number of points in the FFT is N=1/(Δt*Δf)=20. The normal interpretation of the N FFT outputs assumes that the frequency content (Doppler frequency error) of the input samples is band limited to ±F/2. Then the FFT outputs sample the Doppler error at intervals of Δf over ±F/2. The N correlation values of each code phase have been frequency shifted by each of these N frequency values and coherently integrated.

Figure 16A:
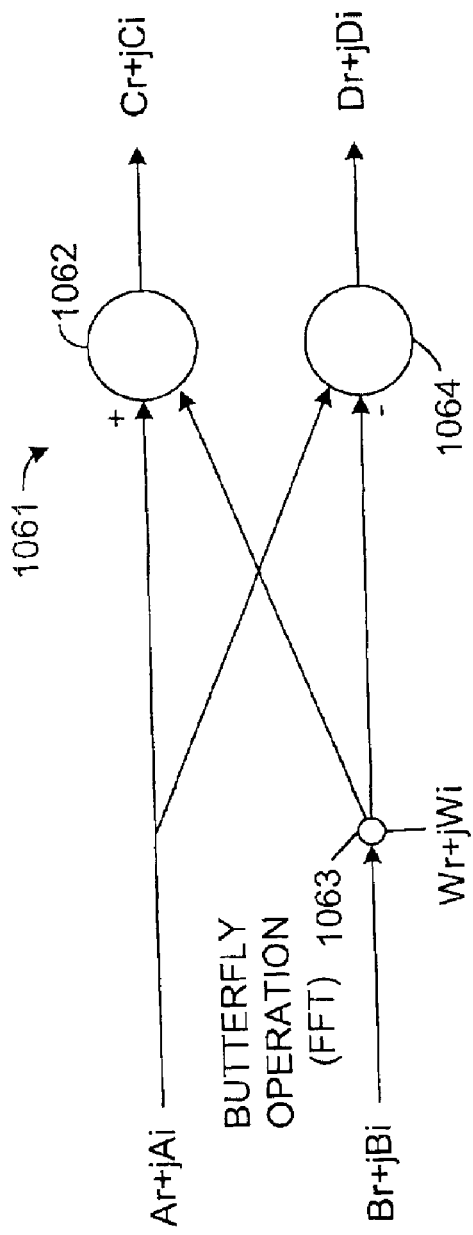
FIGS. 16A and 16B show an embodiment of a Fast Fourier transform (FFT) mechanism employed in the one embodiment of the Doppler phase correction.
Figure 16B:
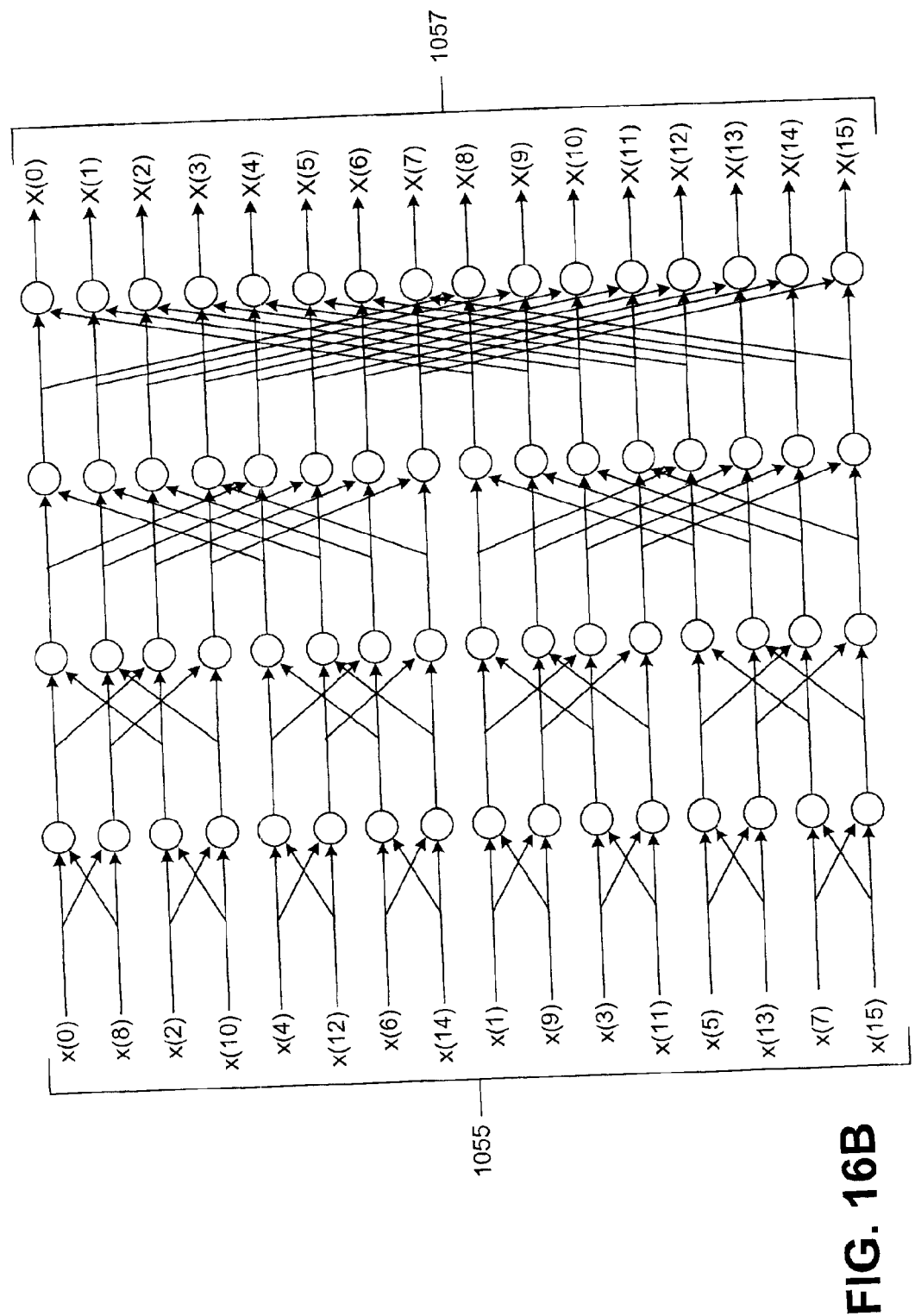

FIGS. 16A and 16B illustrate a nonlimiting example of a specific implementation of the FFT mechanism 1051. FIG. 16A illustrates a single complex butterfly arrangement 1061, of a type that is well known in the processing of an FFT. As is well known, the complex butterfly operation receives two complex input data values A and B where A=Ar+jAi and B=Br+jBi. The complex butterfly operation results in two outputs C and D, where C=Cr+jCi and B=Br+jBi. The operation itself includes multiplying B by a FFT coefficient value W, where W=Wr+jWi. This coefficient value W is often referred to as a twittle factor. The value W is defined based upon and is equal to or proportional to Δw, or R/n (FIG. 15). The point 1063 represents a multiplier which computes the product B and W. This product is added to A, at point 1062, in order to generate the output C. Similarly, the product of B and W is subtracted from A, at point 1064, in order to generate the output D. This complex butterfly operation is performed using predetermined coefficient values W in a predetermined fashion, to generate output data values that represent the FFT of the input data value. As an example, FIG. 16B illustrates the layout of a number of complex butterfly operations in performing a sixteen point FFT. As is shown, a sixteen point FFT includes four states of complex butterfly computations. As the computation of FFTs in accordance with the butterfly chart of FIG. 16B is well known, the details regarding its computation need not be specifically described.

Another point worth mentioning is that the FFT mechanisms in FIGS. 16A and 16B are for a radix 2 algorithm where the number of points in the FFT is a power of 2. For a 20 point FFT, a mixed radix algorithm (with higher performance and less complexity) may be used. Since 20 factors into 20=2*2*5=4*5, either a radix 2 and radix 5 algorithm, or, more likely, a radix 5 and a radix 4 algorithm can be utilized. The aforementioned FFT schemes are well known in the art. Furthermore, in another alternative embodiment, only 16 segments are processed at a time and a radix 2 length 16 FFT is used, as is shown in FIGS. 16A and 16B.

A nonlimiting example of operation is now described. In this example, the following assumptions are made for purposes of description: n=20, k=2045, and the multiplier 28 communicates, incrementally, correlation values 1034 pertaining to 1 ms of input sample and a particular code phase to the Doppler phase correction system 32" of FIG. 15.

In this example, there will be a total of 2046*20 independent values being received by the integrator 30 over each 20 ms period. These values represent 2046 coherent integrations carried out over 20 ms at 20 different Doppler correction frequencies each through 2046 executions of the FFT. Every 20 ms, the multiplier 28 of FIG. 15 (also refer to, for example, SOP 407 in FIG. 10) loads each of the rows of 20 registers with 20 of the 1 ms correlation values 1034 (essentially coherent integrations) of the code phase for that row. Each row is used for a different half chip code phase and all rows are filled each 20 ms interval. Then, each row is next used to produce an FFT having 20 outputs. Each of these outputs is essentially a 20 ms coherent integration for a different frequency. Each output is saved in a suitable storage mechanism (e.g., RAM 413 in FIG. 10) separately. Thus, there are 2046*20 values stored after the first 20 ms. After the second 20 ms, there is another 2046*20 values stored in the storage mechanism. The foregoing values are mathematically combined respectively, for example, via a summing operation (coherently or non-coherently), so that 2046*20 resultant values are derived.

If desired, the aforementioned summing operation can be repeated by the integrator 30 or other suitable processing mechanism (e.g., a microprocessor) for some number of 20 ms periods. Most likely, this summing operation is noncoherent (magnitudes are added, or accumulated, as opposed to coherent, where real and imaginary components are added, or accumulated, separately). Noncoherent integration is preferred because in the preferred embodiment only Doppler correction that is valid over 20 ms has been performed. If it were desirable to perform coherent integration for a longer time period, then coherence in the outputs 1034 from the multiplier 28 would need to be maintained for longer than a 20 ms period.

The foregoing embodiments, implementations, and implementation examples achieve a much more rapid growth in signal to noise ratio (SNR) of correlation data through the coherent integration of incremental portions or subsegments of the samples. As a result, in the case in which the invention is incorporated into a GPS receiver, the result is that desired GPS satellites are detected more quickly. Moreover, power consumption is reduced due to the shorter time that the power detection circuit needs to be operational. Another result, in the case in which the GPS receiver is integrated with a mobile wireless phone, is increased calltime due to increased battery life.

In one example, to a first order, it has been found that, by using coherent integration, a signal detector in accordance with the invention is able to achieve a 3 dB improvement in SNR by increasing the processing time 200%. In contrast, a prior art signal detector employing non-coherent integration requires a 247% increase in processing time to achieve a 3 dB improvement in SNR. Moreover, this relationship is exponential. For example, to achieve a 6 dB improvement in SNR, it has been found that a signal detector in accordance with the invention requires a processing increase of 400%, whereas a signal detector of the prior art requires a 610% increase in processing time.

Another advantage of the invention is that it takes advantage of cellular and PCS phone systems and their ability to provide external sources of data useful to GPS. This data includes precise time and frequency information, and direct or indirect information regarding data epochs 324 (FIG. 9; frame boundaries), and phase reversals at the frame boundaries as required for coherent integration.

Another advantage is that reliance on the matched filter of the subject invention to perform coherent integration reduces the load on the GPS processor. It also reduces the amount of RAM that the outside processor must dedicate to GPS.

Although embodiments and implementations have been described which utilize a GPS processor to perform various functions, it should be understood that embodiments are possible in which a generic processor is used to perform these functions. For purposes of this disclosure, a generic processor is defined to mean any device, including a computer, DSP, baseband processor, microprocessor, or microcomputer, which is capable of executing a discrete series of instructions stored in a memory accessible by the processor. It should also be understood that embodiments are possible in which analog circuitry is used to perform these functions.

The present invention can be implemented in the system described in U.S. Pat. No. 5,825,327, entitled "GPS Receivers And Garments Containing GPS Receivers And Methods For Using These GPS Receives," which is incorporated by reference.

U.S. Pat. No. 5,825,327 discloses a GPS receiver having multiple GPS antennas. Also described is a method of tracking employing the GPS receiver and a communication transmitter. Also described is a garment having a GPS receiver, a GPS antenna, a communication antenna, and a communication transmitter.

The present invention can be implemented in the system described in U.S. Pat. No. 5,945,944, entitled "Method And Apparatus For Determining Time For GPS Receivers," which is incorporated by reference.

U.S. Pat. No. 5,945,944 discloses a method and apparatus of determining the time for a global positioning system receiver. Timing signals derived from a communication system, such as cellular phone transmission signals, are received by a GPS receiver and decoded to provide accurate time information. The timing signals may be in the form of synchronized events marked by timing indicators, or as system time information. The timing signals in combination with satellite position signals received by the GPS receiver are used to determine the position of the GPS receiver.

The present invention can be implemented in the system described in U.S. Pat. No. 5,831,574, entitled "Method And Apparatus For Determining the Location OF An Object Which May Have An Obstructed View Of The Sky," which is incorporated by reference.

U.S. Pat. No. 5,831,574 discloses the following. A positioning sensor receives and stores a predetermined record length of positioning signals while in a fix position located such that the positioning sensor can receive positioning signals. Thereafter, the stored positioning signals rare processed to determine the geographic location of a the fix position. The fix position may correspond to a location of an object of interest or it may be in a known location relative to the position of the object, in which case once the geographic location of the fix position has been computed, the geographic location of the object can be derived. The positioning sensor includes a Snapshot GPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with t depth sensing means, such as a pressure sensor, which allows a determination of the depth of submerged object to be made. The positioning sensor may further be equipped with signal detecting means for determining when the positioning sensor is in the fix position.

The present invention can be implemented in the system described in U.S. Pat. No. 5,884,214, entitled "GPS Receiver And Method For Processing GPS Signals," which is incorporated by reference.

U.S. Pat. No. 5,884,214 discloses the following. A global positioning system (GPS) receiver has first circuitry for receiving and processing pseudorandom sequences transmitted by a number of GPS satellites. The first circuitry is configured to perform conventional correlation operations on the received pseudorandom sequences to determine pseudoranges from the GPS receiver to the GPS satellites. The GPS receiver also includes second circuitry coupled to the first circuitry. The second circuitry is configured to receive and process the pseudorandom sequences during blockage conditions. The second circuitry processes the pseudorandom sequences by digitizing and stoning a predetermined record length of the received sequences and then performing fast convolution operations on the stored data to determine the pseudoranges. The GPS receiver may have a common circuitry for receiving GPS signals form in view satellites and downconverting the RF frequency of the received GPS signals to an intermediate frequency (IF). The IF signals are split into two signal paths; a first of which provides the conventional correlation processing to calculate the pseudoranges. During blockage conditions, the IF signal is passed to the second signal path wherein the IF signals are digitized and stored in memory and later processed using the fast convolution operations to provide the pseudoranges. Alternative arrangements for the two signal paths include separate downconverters or shared digitizers. One embodiment provides both signal paths on a single integrated circuit with shared circuitry executing computer readable instructions to perform GPS signal processing appropriate to the reception conditions.

The present invention can be implemented in the system described in U.S. Pat. No. 5,874,914, entitled "GPS Receiver Utilizing A Communication Link", which is incorporated by reference.

U.S. Pat. No. 5,874,914 discloses the following. A GPS receiver in one embodiment includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

The present invention can be implemented in the system described in U.S. Pat. No. 6,016,119, entitled "Method And Apparatus For Determining The Location Of An Object Which May Have An Obstructed View Of The Sky," which is incorporated by reference.

U.S. Pat. No. 6,016,119 discloses the following. A positioning sensor receives and stores a predetermined record length of positioning signals while in a fix position located such that the positioning sensor can receive positioning signals. Thereafter, the stored positioning signals are processed to determine the geographic location of the fix position. The fix position may correspond to a location of an object of interest or it may be in a known location relative to the position of the object, in which case once the geographic location of the fix position has been computed, the geographic location of the object can be derived. The positioning sensor includes a Snapshot GPS receiver which may collect and process GPS signals transmitted by GPS satellites using fast convolution operations to compute pseudoranges from the GPS satellites to the fix position. Alternatively, these computations may be performed at a basestation. The computed pseudoranges may then be used to determine the geographic location of the fix position. The positioning sensor may be equipped with depth sensing means, such as a pressure sensor, which allows a determination of the depth of submerged object to be made. The positioning sensor may further be equipped with signal detecting means for determining when the positioning sensor is in the fix position.

The present invention can be implemented in the system described in U.S. Pat. No. 5,781,156, entitled "GPS Receiver And Method For processing GPS Signals," which is incorporated by reference.

U.S. Pat. No. 5,781,156 discloses the following. A GPS receiver in one embodiment includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DPS) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

The present invention can be implemented in the system described in U.S. Pat. No. 5,841,396, entitled "GPS Receiver Utilizing A Communication Link," which is incorporated by reference.

U.S. Pat. No. 5,841,396 discloses the following. A precision carrier frequency signal for calibrating a local oscillator of a GPS receiver which is used to acquire GPS signals. The precision carrier frequency signal is sued to calibrate the local oscillator such that the output of the local oscillator, which is used to acquire GPS signals, is modified by a reference signal generated from the precision carrier frequency signal. The GPS receiver locks to this precision carrier frequency signal and generates the reference signal. In another aspect of the invention, satellite almanac data is transmitted to a remote GPS receiver unit from a basestation via a communication link. The remote GPS receiver unit uses this satellite almanac data to determine approximate Doppler data for satellites in view of the remote GPS receiver unit.

The present invention can be implemented in the system described in U.S. Pat. No. 5,999,124, entitled "Satellite Positioning System Augmentation With Wireless Communication Signals," which is incorporated by reference.

U.S. Pat. No. 5,999,124 discloses a method and apparatus for processing position information from satellite positioning system satellites and from cellular based communication signals. In one example of a method according to the invention, a SPS receiver receives SPS signals from at least one SPS satellite. This SPS receiver is coupled to and typically integrated with a communication system which receives and transmits messages in a cell based communication system. In this method, a message is transmitted in the cell based communication signals between a communication system and a first cell based transceiver. A time measurement which represents a time of travel of a message in the cell based communication signals between the cell based transceiver and the communication system is determined. Another time measurement which represents a time of travel of the SPS signals is also determined. A position of the SPS receiver is determined from a combination of at least the time measurement which represents the time of travel of a message in the cell based communication signals and from a time measurement which represents a time travel of the SPS signals. The cell based communication signals are capable of communicating data messages in a two-way direction in one embodiment between the cell based transceiver and the communication system.

The present invention can be implemented in the system described in U.S. Pat. No. 6,002,363, entitled "Combined GPS Positioning System And Communications System Utilizing Shared Circuitry," which is incorporated by reference.

U.S. Pat. No. 6,002,363 discloses a combined GPS and communication system having shared circuitry. The combined system, includes as antenna for receiving data representative of GPS signals, a frequency converter coupled to the antenna, a frequency synthesizer coupled to the frequency converter, an analog to digital converter coupled to the frequency converter and a processor coupled to the frequency converter. The processor processes the data representative of GPS signals to determine a pseudorange based on the data representative of GPS signals to determine a pseudorange based on the data representative of GPS signals. The integrated communication receiver includes a shared component which is at least one of the antenna, the frequency converter, the frequency synthesizer and the analog to digital converter. Typically, in certain embodiments, the processor also demodulates communication signals received as well as controls the modulation of data to be transmitted as a communication signal through a communication link.

While various embodiments of the application have been described, it will be apparent to those of ordinary skill in the art that many more embodiments and implementations are possible that are within the scope of the subject invention. Accordingly, the invention is not to be restricted except in light of the appended claims and their equivalents.

What is claimed is:

1. A method for a spread spectrum detector, comprising the steps of:
   receiving a spread spectrum modulated signal having a Doppler shift error imposed by movement between a signal source and a receiver;
   producing a plurality of complex first correlation values based upon the signal, a carrier doppler shift, and a code;
   generating a plurality of complex second correlation values respectively from the first correlation values, wherein generating includes combining a correction for the Doppler shift error with each of the first correlation values to produce the second correlation values; and
   integrating the second correlation values to derive a complex third correlation value that indicates a degree of correspondence of the code with the signal.

2. The method of claim 1, further comprising the steps of:
   performing the producing, generating, and integrating steps a plurality of times with a different code phase of the code each time in order to produce a plurality of third correlation values; and
   determining that a particular one of the code phases corresponds to the signal based upon the third correction values.

3. The method of claim 1, wherein the producing step comprises the steps of:
   multiplying chips of the code with signal samples, respectively, to derive multiplication results; and
   adding together the multiplication results to produce the first correlation values.

4. The method of claim 1, wherein the step of producing the first correlation values is performed multiple times, each time using a different carrier doppler shifts so that each of the second correlation values is offset by a different phase shift.

5. The method of claim 1, wherein the second correlation values are combined coherently in the integrating step so that the third correlation value comprises a real number part and an imaginary number part, which are collectively indicative of a magnitude and a phase.

6. The method of claim 1, wherein the second correlation values are combined noncoherently in the integrating step so that the third correlation value comprises a magnitude.

7. The method of claim 1, wherein the producing step comprises the step of using a matched filter to produce the first correlation values.

8. The method of claim 1, wherein the producing step comprises the step of using a digital signal processor to produce the first correlation values.

9. The method of claim 1, wherein the signal is received from a satellite associated with a global positioning system.

10. The method of claim 1, wherein the signal is a carrier signal modulated with a repeating code.

11. The method of claim 2, wherein the determining step is performed by a processor.

12. A method for a spread spectrum detector, comprising the steps of:
   receiving a spread spectrum modulated signal having a Doppler shift error imposed by movement between a signal source and a receiver;
   producing a plurality of complex first correlation values based upon the signal, a carrier doppler shift, and a code;
   generating a plurality of complex second correlation values respectively from the first correlation values, wherein generating includes combining a phase shift value a correction for the Doppler shift error with each of the first correlation values to produce the second correlation values; and
   combining the second correlation values to derive a complex third correlation value that indicates a degree of correspondence of the code with the signal;
   providing a look-up table storing a plurality of phase shift values;
   providing a counter that produces indices for the look-up table;
   identifying the phase shift value for each of the first correlation values based upon the indices and the look-up table; and
   multiplying each first correlation value with each phase shift value to produce each second correlation value.

13. A spread spectrum detector, comprising:
   first means for receiving a spread spectrum modulated signal having a Doppler shift error imposed by movement between a signal source and a receiver;
   second means for producing a plurality of complex first correlation values based upon the signal, a carrier Doppler shift, and a code;
   third means for generating a plurality of complex second correlation values respectively from the first correlation values, wherein generating includes combining a correction for the Doppler shift error with each of the first correlation values to produce the second correlation values; and
   fourth means for combining the second correlation values to derive a third correlation value that indicates a degree of correspondence of the code with the signal.

14. The detector of claim 13, further comprising:
fifth means for determining that a code phase of the code corresponds to the signal based upon the third correlation value.

15. The detector of claim 13, wherein the second means comprise:
means for multiplying chips of the code with signal samples, respectively, to derive multiplication results; and
means for adding together the multiplication results to produce the first correlation values.

16. The detector of claim 13, wherein the first correlation values include multiple incrementally different carrier doppler shifts so that the first correlation values represent a plurality of different phase shifts.

17. The detector of claim 13, wherein the fourth means comprises a means for coherently combining the second correlation values together so that the third correlation value comprises a real number part and an imaginary number part, which are collectively indicative of a magnitude and a phase.

18. The detector of claim 13, wherein the fourth means comprises a means for noncoherently combining the second correlation values together so that the third correlation value comprises a magnitude and no phase information.

19. The detector of claim 13, wherein the second means comprises a matched filter means for producing the first correlation values.

20. The detector of claim 13, wherein the second means comprises a digital signal processor to produce the first correlation values.

21. The detector of claim 13, wherein the signal is received from a satellite associated with a global positioning system.

22. The detector of claim 13, wherein the signal is a carrier signal modulated with a repeating code.

23. A spread spectrum detector, comprising:
first means for receiving a spread spectrum modulated signal having a Doppler shift error imposed by movement between a signal source and a receiver;
second means for producing a plurality of complex first correlation values based upon the signal, a carrier doppler shift, and a code;
third means for generating a plurality of complex second correlation values respectively from the first correlation values, wherein the third means comprises,
means for storing a plurality of phase shift values;
means for identifying the phase shift value for each of the first correlation values;
means for multiplying each first correlation value with each phase shift value to produce each second correlation value; and
means for combining a correction for the Doppler shift error with each of the first correlation values to produce the second correlation values; and
fourth means for combining the second correlation values to derive a third correlation value that indicates a degree of correspondence of the code with the signal.

24. A spread spectrum detector, comprising:
a receiver configured to receive a spread spectrum modulated signal having a Doppler shift error imposed by movement between a signal source and a receiver;
a multiplier configured to produce a plurality of complex first correlation values based upon the signal, a carrier doppler shift and a code;
a phase shifter configured to generate a plurality of complex second correlation values respectively from the first correlation values, wherein generating includes combining a correction for the Doppler shift error with each of the first correlation values to produce the second correlation values; and
an integrator configured to integrate the second correlation values to derive a third correlation value that indicates a degree of correspondence of the code with the signal.

25. The spread spectrum detector of claim 24, further comprising:
a processor programmed to determine that a particular one of code phases of the code corresponds to the signal based upon the third correlation value.

26. The detector of claim 24, wherein the multiplier comprises:
a plurality of multipliers configured to multiply chips of each code phase with signal samples, respectively, to derive the multiplication results; and
adders configured to add together the multiplication results to produce the first correlation values.

27. The detector of claim 24, wherein the phase shifter is configured to concurrently FFT process n complex second correlation values, where n is a number of iterations of multiplicative correlation using a same code phase in the multiplier.

28. The detector of claim 24, wherein the integrator is configured to coherently combine the second correlation values together so that the third correlation value comprises a real number part and an imaginary number part, which are collectively indicative of a magnitude and a phase.

29. The detector of claim 24, wherein the integrator is configured to noncoherently combine the second correlation values together so that the third correlation value comprises a magnitude and no phase information.

30. The detector of claim 24, wherein the multiplier comprises a matched filter configured to produce the first correlation values.

31. The detector of claim 24, wherein the multiplier comprises a digital signal processor to produce the first correlation values.

32. The detector of claim 24 wherein the signal is received from a satellite associated with a global positioning system.

33. The detector of claim 24, wherein the signal is a carrier signal modulated with a repeating code.

34. A spread spectrum detector, comprising:
a receiver configured to receive a spread spectrum modulated signal having a Doppler shift error imposed by movement between a signal source and a receiver;
a multiplier configured to produce a plurality of complex first correlation values based upon the signal, a carrier doppler shift and a code;
a phase shifter configured to generate a plurality of complex second correlation values respectively from the first correlation values, wherein the phase shifter comprises a mixer for combining a correction for the Doppler shift error with each of the first correlation values to produce the second correlation values; and
an integrator configured to integrate the second correlation values to derive a third correlation value that indicates a degree of correspondence of the code with the signal;
a memory for storing a plurality of phase shift values; and
a counter producing addresses in the memory to identify the phase shift values for the first correlation values, respectively.

35. A computer readable medium having a program for operating a spread spectrum detector, the program comprising:
    first logic configured to receive a spread spectrum modulated signal having a Doppler shift error imposed by movement between a signal source and a receiver;
    second logic configured to produce a plurality of complex first correlation values based upon the signal, a carrier doppler shift and a code;
    third logic configured to generate a plurality of complex second correlation values respectively from the first correlation values wherein generating includes combining a correction for the Doppler shift error with each of the first correlation values to produce the second correlation values; and
    fourth logic configured to combine the second correlation values to derive a complex third correlation value that indicates a degree of correspondence of the code with the signal.

36. The computer readable medium as defined in claim 35, further comprising:
    fifth logic configured to cause the second, third and fourth logics to perform their respective producing, generating, and combining steps a plurality of times with a different code phase of the code each time in order to produce a plurality of third correlation values; and
    sixth logic configured to determine that a particular one of the code phases corresponds to the signal based upon the third correlation values.

37. The computer readable medium as defined in claim 35, wherein the second logic comprises:
    logic configured to multiply chips of the code with signal samples, respectively, to derive the multiplication results; and
    logic configured to add together the multiplication results to produce the first correlation values.

38. The computer readable medium as defined in claim 35, wherein the second logic comprises logic configured to combine the first correlation values with incrementally different carrier doppler shifts so that each of the second correlation values is offset by a different phase shift.

39. The computer readable medium as defined in claim 35, wherein the fourth logic comprises logic to coherently combine the second correlation values to produce the third correlation value so that the third correlation value comprises a real number part and an imaginary number part, which are collectively indicative of a magnitude and a phase.

40. The computer readable medium as defined in claim 35, wherein the fourth logic comprises logic to noncoherently combine the second correlation values to produce the third correlation value so that the third correlation value comprises a magnitude without phase information.

41. The computer readable medium as defined in claim 35, wherein the second logic comprises logic configured to use a matched filter to produce the first correlation values.

42. The computer readable medium as defined in claim 35, wherein the second logic comprises logic configured to use a digital signal processor to produce the first correlation values.

43. The computer readable medium as defined in claim 35, wherein the first logic is configured to receive a signal from a satellite associated with a global positioning system.

44. The computer readable medium as defined in claim 35, wherein the first logic is configured to receive a carrier signal modulated with a repeating code.

45. A computer readable medium having a program for operating a spread spectrum detector, the program comprising:
    first logic configured to receive a spread spectrum modulated signal having a Doppler shift error imposed by movement between a signal source and a receiver;
    second logic configured to produce a plurality of complex first correlation values based upon the signal, a carrier doppler shift and a code;
    third logic configured to generate a plurality of complex second correlation values respectively from the first correlation values and a correction for the Doppler shift error, wherein the third logic comprises:
        a look-up table storing a plurality of phase shift values;
        a counter that produces indices for the look-up table;
        a multiplier to multiply each first correlation value with a phase shift value to produce a second correlation value; and
    fourth logic configured to combine the second correlation values to derive a complex third correlation value that indicates a degree of correspondence of the code with the signal.

46. A GPS receiver, comprising:
    a first GPS antenna coupled to a digital memory, the digital memory storing first digitized signals obtained through the first GPS antenna;
    a second GPS antenna coupled to the digital memory, the digital memory storing second digitized signals obtained through the second GPS antenna;
    a digital processor coupled to the digital memory, the digital processor processing the first digitized signals after being stored in the digital memory to provide the first position information and processing the second digitized signals after being stored in the digital memory to provide second position information;
    a receiver configured to receive a spread spectrum modulated signal having a Doppler shift error imposed by movement between a signal source and a receiver;
    a multiplier configured to produce a plurality of complex first correlation values based upon the signal, a carrier doppler shift, and a code;
    a phase shifter configured to generate a plurality of complex second correlation values respectively from the first correlation values, wherein generating includes combining a correction to the Doppler shift error with each of the first correlation values to produce the second correlation values; and
    an integrator configured to integrate the second correlation values to derive a third correlation value that indicates a degree of correspondence of the code with the signal.

47. A method of operating a GPS receiver, the method comprising:
    receiving first GPS signals through a first GPS antenna;
    digitizing the first GPS signals to provide first digitized signals and storing the first digitized signals in a first digital memory;
    receiving second GPS signals through a second GPS antenna;
    digitizing the second GPS signals to provide second digitized signals and storing the second digitized signals in one of the first digital memory and a second digital memory;
    processing in a digital processor the stored first digitized signals to provide a first position information and processing the stored second digitized signals to provide a second position information;

selecting one of the first position information and the second position information to provide a selected position information; and when performing the processing step, performing the following steps upon each of the first and second GPS signals;

producing a plurality of complex first correlation values based upon the signal, a carrier doppler shift and a code;

generating a plurality of complex second correlation values respectively from the first correlation values, wherein generating includes combining a correction for the Doppler error shift with each of the first correlation values to produce the second correlation values; and combining the second correlation values to derive a complex third correlation value that indicates a degree of correspondence of the code with the signal.

48. A method for determining a position of a mobile global positioning system receiver, the mobile global positioning receiver receiving global positioning system signals from at least one of a plurality of global positioning system (GPS) satellites, the method comprising:

receiving a cellular communication signal in a mobile communication receiver coupled to the mobile global positioning system receiver, the cellular communication signal having a time indicator which represents a time event;

associating the time indicator with data representing a time of arrival of a GPS satellite signal at the mobile global positioning system receiver;

determining position information of the mobile global positioning system receiver, wherein the data representing the time of arrival of the GPS satellite signal and the time indicator are used to determine the position information of the mobile global positioning system receiver and wherein the cellular communication signal supports 2-way communications; and when performing the determining step, performing the following steps:

producing a plurality of complex first correlation values based upon a signal and a code;

generating a plurality of complex second correlation values respectively from the first correlation values, wherein generating includes combining a correction for the Doppler shift error with each of the first correlation values to produce the second correlation values; and combining the second correlation values to derive a complex third correlation value that indicates a degree of correspondence of the code with the signal.

49. A method of operating a global positioning system (GPS) receiver, comprising:

sensing whether GPS signals are capable of being received from GPS satellites and providing an activation signal when GPS signals are capable of being received;

maintaining the GPS receiver in a low power state;

activating the GPS receiver from the low power state upon detecting the activation signal;

producing a plurality of complex first correlation values based upon a GPS signal, a carrier doppler shift and a code;

generating a plurality of complex second correlation values respectively from the first correlation values, wherein generating includes combining a correction for a Doppler shift error with each of the first correlation values to produce the second correlation values; and combining the second correlation values to derive a complex third correlation value that indicates a degree of correspondence of the code with the signal.

50. A method for using a dual mode GPS receiver, the method comprising the steps of:

activating the GPS receiver in a first mode of operation including, receiving GPS signals from in view satellites;

downconverting and demodulating the GPS signals to extract Doppler information regarding in view satellites and to compute pseudorange information;

storing the Doppler information;

detecting when the GPS information is experiencing blockage conditions and activating a second mode of operation in response thereto, the second mode including, digitizing the GPS signals at a predetermined rate to produce sampled GPS signals; and receiving a signal having a Doppler shift error imposed by movement between a signal source and the GPS receiver;

producing a plurality of complex first correlation values based upon the signal, a carrier doppler shift and a code;

generating a plurality of complex second correlation values respectively from the first correlation values, wherein generating includes combining a a correction for Doppler shift error with each of the first correlation values to produce the second correlation values; and combining the second correlation values to derive a complex third correlation value that indicates a degree of correspondence of the code with the signal.

51. In a method for determining the position of a remote unit, a process comprising:

receiving, at the remote unit from a transmission cell in a cellular communication system, a Doppler information of a satellite in view of the remote unit;

computing, in a remote unit, position information for the satellite by using the Doppler information without receiving and without using satellite ephemeris information;

when computing the position information, performing the following steps:

producing a plurality of complex first correlation values based upon the signal, a carrier doppler shift and a code;

generating a plurality of complex second correlation values respectively from the first correlation values, wherein generating includes combining a correction for a Doppler shift error with each of the first correlation values to produce the second correlation values; and combining the second correlation values to derive a complex third correlation value that indicates a degree of correspondence of the code with the signal.

52. A method of using a base station for providing a communications link to a mobile GPS unit, the method comprising:

determining Doppler information of a satellite in view of the mobile GPS unit, wherein the Doppler information is used by the mobile GPS unit to determine a position information for the satellite;

transmitting from a transmission cell in a cellular communication system the Doppler information of the satellite in view to the mobile GPS unit wherein the mobile GPS unit determines the position information without receiving and without using satellite ephemeris information;

when performing the determining step, performing the following steps:
receiving a signal having a Doppler shift error imposed by movement between a satellite and a GPS receiver producing a plurality of complex first correlation values based upon the signal, a carrier doppler shift and a code;
generating a plurality of complex second correlation values respectively from the first correlation values, wherein generating includes combining a correction for the Doppler shift error with each of the first correlation values to produce the second correlation values; and
combining the second correlation values to derive a complex third correlation value that indicates a degree of correspondence of the code with the signal.

53. A method of determining the location of a remote object comprising the steps of:
transporting a positioning sensor to a remote object;
repositioning the positioning sensor to a fix position such that the positioning sensor is capable of receiving positioning signals, the fix position being in a known position relative to the position of the remote sensor;
storing a predetermined amount of data in the positioning sensor while the positioning sensor is located at the fix position, the data comprising the positioning signals;
processing the data to determine the location of the fix position;
computing the location of the remote object using the location of the fix position; and
when performing the processing steps, performing the following steps:
producing a plurality of complex first correlation values based upon the signal, a carrier doppler shift and a code;
generating a plurality of complex second correlation values respectively from the first correlation values, wherein generating includes combining a correction for a Doppler shift error with each of the first correlation values to produce the second correlation values; and
combining the second correlation values to derive a complex third correlation value that indicates a degree of correspondence of the code with the signal.

54. A method of tracking a remote object comprising the steps of:
fitting a remote object with a positioning sensor configured to receive and store positioning information when the remote object is in a fix position;
positioning the remote object in a fix position such that the positioning sensor is capable of detecting an activation signal;
processing and storing a predetermined amount of data in the positioning sensor, the data comprising position information;
processing the data to determine the location of the fix position;
when processing the data, performing the following steps:
producing a plurality of complex first correlation values based upon the signal, a carrier doppler shift and a code;
generating a plurality of complex second correlation values respectively from the first correlation values, wherein generating includes combining a correction for a Doppler shift error with each of the first correlation values to produce the second correlation values; and
combining the second correlation values to derive a complex third correlation value that indicates a degree of correspondence of the code with the signal.

55. A computer readable medium containing a computer program having executable code for a GPS receiver, the computer program comprising:
first instructions for receiving GPS signals from in view satellites, the GPS signals comprising pseudorandom codes;
second instructions for digitizing the GPS signals at a predetermined rate to produce sampled GPS signals;
third instructions for storing the sampled GPS signals in a memory; and
fourth instructions for processing the sampled GPS signal by performing a plurality of convolutions on the sampled GPS signals, the processing comprising performing the plurality of convolutions on a corresponding plurality of blocks of the sampled GPS signals to provide a plurality of corresponding results of each convolution and summing a plurality of mathematical representations of the plurality of corresponding results to obtain a first position information; and
wherein the fourth instructions are designed to:
produce a plurality of complex first correlation values based upon the signal, a carrier doppler shift and a code;
generate a plurality of complex second correlation values respectively from the first correlation values, wherein generating includes combining a correction for a Doppler shift error with each of the first correlation values to produce the second correlation values; and
combine the second correlation values to derive a complex third correlation value that indicates a degree of correspondence of the code with the signal.

56. A computer readable medium containing an executable computer program for use in a digital processing system, the executable computer program when executed in the digital processing system causing the digital processing system to perform the steps of:
performing a plurality of convolutions of a corresponding plurality of blocks of sampled GPS signals to provide a plurality of corresponding results of each convolution;
summing a plurality of mathematical representations of the plurality of corresponding results to obtain a first position information; and
when performing the plurality of convolutions step, performing at least the following steps:
producing a plurality of complex first correlation values based upon the signal, a carrier doppler shift and a code;
generating a plurality of complex second correlation values respectively from the first correlation values, wherein generating includes combining a correction for a Doppler shift error with each of the first correlation values to produce the second correlation values; and
combining the second correlation values to derive a complex third correlation value that indicates a degree of correspondence of the code with the signal.

57. A method of calibrating a local oscillator in a mobile GPS receiver, the method comprising:

receiving a precision carrier frequency signal from a source providing the precision carrier frequency;

automatically locking to the precision carrier frequency signal and providing a reference signal;

calibrating the local oscillator with the reference signal, the local oscillator being used to acquire GPS signals;

receiving a signal having a Doppler shift error imposed by movement between a signal source and the GPS receiver, producing a plurality of complex first correlation values based upon the signal, a carrier doppler shift and a code;

generating a plurality of complex second correlation values respectively from the first correlation values, wherein generating includes combining a correction for the Doppler shift error with each of the first correlation values to produce the second correlation values; and combining the second correlation values to derive a complex third correlation value that indicates a degree of correspondence of the code with the signal.

58. A method of using a base station to calibrate a local oscillator in a mobile GPS receiver, the method comprising:

producing a first reference signal having a precision frequency;

modulating the first reference signal with a data signal to provide a precision carrier frequency signal;

transmitting the precision carrier frequency signal to the mobile GPS receiver, the precision carrier frequency signal being used to calibrate a local oscillator in the mobile GPS receiver, the local oscillator being used to acquire GPS signals;

receiving a spread spectrum signal having a Doppler shift error imposed by movement between a signal source and the GPS receiver;

producing a plurality of complex first correlation values based upon the signal, a carrier doppler shift, and a code;

generating a plurality of complex second correlation values respectively from the first correlation values, wherein generating includes combining a correction for the Doppler shift error with each of the first correlation values to produce the second correlation values; and combining the second correlation values to derive a complex third correlation value that indicates a degree of correspondence of the code with the signal.

59. A method of deriving a local oscillator signal in a mobile GPS receiver, the method comprising:

receiving a precision carrier frequency signal from a source providing the precision carrier frequency signal;

automatically locking to the precision carrier frequency signal and providing a reference signal;

using the reference signal to provide a local oscillator signal to acquire GPS signals;

receiving a spread spectrum signal having a Doppler shift error imposed by movement between a signal source and the GPS receiver;

producing a plurality of complex first correlation values based upon the signal, a carrier doppler shift, and a code;

generating a plurality of complex second correlation values respectively from the first correlation values, wherein generating includes combining a correction for the Doppler shift error with each of the first correlation values to produce the second correlation values; and combining the second correlation values to derive a complex third correlation value that indicates a degree of correspondence of the code with the signal.

60. A method of processing position information, the method comprising:

receiving SPS signals from at least one SPS satellite;

transmitting cell based communication signals between a communication system coupled to the SPS receiver and a first cell based transceiver which is remotely positioned relative to the SPS receiver wherein the cell based communication signals are wireless;

determining a first time measurement which represents a time of travel of a message in the cell based communication signals in a cell based communication system which comprises a first cell based transceiver and the communications system;

determining a second time measurement which represents a time of travel of the SPS signals;

determining a position of the SPS receiver from at least one of the first time measurement and the second time measurement, wherein the cell based communication signals are capable of communicating data messages in a two-way direction between the first cell based transceiver and the communication system; and performing the following steps during at least one of the determining steps:

producing a plurality of complex first correlation values based upon the signal, a carrier doppler shift and a code;

generating a plurality of complex second correlation values respectively from the first correlation values, wherein generating includes combining a correction for a Doppler error shift with each of the first correlation values to produce the second correlation values; and combining the second correlation values to derive a complex third correlation value that indicates a degree of correspondence of the code with the signal.

61. A method of processing position information in a digital processing system, the method comprising:

determining a first time measurement which represents a time of travel of a message in cell based communication signals in a cell based communication system which comprises a first cell based transceiver which communicates with the digital processing system and a communication system which communicates in a wireless manner with the first cell based transceiver;

determining a position of a SPS receiver from at least the first time measurement and a second time measurement which represents a time of travel of SPS signals received at the SPS receiver which is integrated with the communication system and is remotely located relative to the first cell based transceiver and the digital processing system, wherein the cell based communication signals are capable of communicating messages from the communication system to the first cell based transceiver; and performing the following steps when determining the position:

receiving a signal having a Doppler shift error imposed by movement between a signal source and the GPS receiver;

producing a plurality of complex first correlation values based upon an SPS signal, a carrier doppler shift and a code;

generating a plurality of complex second correlation values respectively from the first correlation values, wherein generating includes combining a correction for the doppler shift error with each of the first correlation values to produce the second correlation values; and combining the second correlation values to derive a complex third correlation value that indicates a degree of correspondence of the code with the signal.

62. A method of controlling a communication link and processing data representative of GPS signals from at least one satellite in a GPS receiver, the method comprising:

processing the data representative of GPS signals from at least one satellite in a processing unit, including performing a correlation function to determine a pseudorange based on the data representative of GPS signals;

controlling communication signals through the communication link by using the processing unit to perform the controlling and wherein the processing unit performs demodulation of communication signals sent to the GPS receiver; and when performing the processing step, performing at least the following steps:

receiving a signal having a Doppler shift error imposed by movement between a signal source and the GPS receiver;

producing a plurality of complex first correlation values based upon the signal, a carrier doppler shift and a code;

generating a plurality of complex second correlation values respectively from the first correlation values, wherein generating includes combining a correction for the Doppler shift error with each of the first correlation values to produce the second correlation values; and combining the second correlation values to derive a complex third correlation value that indicates a degree of correspondence of the code with the signal.

* * * * *